(12) United States Patent
Mizutani et al.

(10) Patent No.: US 9,552,310 B2
(45) Date of Patent: Jan. 24, 2017

(54) SIGNAL CONTROL CIRCUIT, INFORMATION PROCESSING APPARATUS, AND SIGNAL CONTROL METHOD

(71) Applicant: FUJITSU LIMITED, Kawasaki-shi, Kanagawa (JP)

(72) Inventors: Ryo Mizutani, Kawasaki (JP); Noriyuki Tokuhiro, Kawasaki (JP); Michitaka Hashimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 219 days.

(21) Appl. No.: 14/481,976

(22) Filed: Sep. 10, 2014

(65) Prior Publication Data

US 2015/0121117 A1  Apr. 30, 2015

(30) Foreign Application Priority Data

Oct. 31, 2013  (JP) ................. 2013-227580

(51) Int. Cl.
*G06F 1/12* (2006.01)
*G06F 13/16* (2006.01)

(52) U.S. Cl.
CPC ................. *G06F 13/1689* (2013.01)

(58) Field of Classification Search
CPC ............. G06F 13/1689; G06F 13/4234
See application file for complete search history.

(56) References Cited

U.S. PATENT DOCUMENTS

| | | | |
|---|---|---|---|
| 5,452,333 A | 9/1995 | Guo et al. | |
| 7,227,395 B1* | 6/2007 | Huang | G11C 7/22 327/158 |
| 7,636,001 B2 | 12/2009 | Kumata | |
| 7,956,660 B2 | 6/2011 | Ooshima et al. | |
| 2008/0056029 A1* | 3/2008 | Cheng | G06F 13/4243 365/194 |
| 2008/0062780 A1* | 3/2008 | Cheng | G11C 7/22 365/193 |
| 2008/0238506 A1* | 10/2008 | Choi | H03K 7/04 327/158 |
| 2011/0176372 A1* | 7/2011 | Baba | G06F 13/4239 365/189.05 |
| 2012/0242385 A1 | 9/2012 | Tokuhiro | |
| 2014/0013149 A1* | 1/2014 | Lee | G06F 13/1689 713/401 |

FOREIGN PATENT DOCUMENTS

| | | |
|---|---|---|
| JP | 06-061991 | 3/1994 |
| JP | 2007-228044 | 9/2007 |
| JP | 2009-232366 | 10/2009 |
| WO | 2011-077573 | 6/2011 |

* cited by examiner

*Primary Examiner* — Thomas Lee
*Assistant Examiner* — Chad Erdman
(74) *Attorney, Agent, or Firm* — Fujitsu Patent Center

(57) ABSTRACT

An EVEN component selecting unit and an ODD component selecting unit acquire a first signal from a DQ signal based on a rising edge of a DQS signal and a second signal from the DQ signal based on a falling edge of the DQS signal. Variable delay adding units give the first signal a first delay based on a phase difference between an internal clock signal and the rising edge of the DQS signal and give the second signal a second delay based on a phase difference between the internal clock signal and the falling edge of the DQS signal. Data capturing units capture, based on the internal clock signal, data from the first signal to which the first delay is given and the second signal to which the second delay is given.

5 Claims, 15 Drawing Sheets

FIG.14

| PHASE INFORMATION | POST-XOR PHASE INFORMATION | PHASE CONDITION |
|---|---|---|
| 00 | 11 | PHASE ADVANCED CONDITION |
| 10 | 01 | PHASE COINCIDENT CONDITION |
| 11 | 00 | PHASE DELAYED CONDITION |
| 01 | 10 | PHASE FAULTY CONDITION |

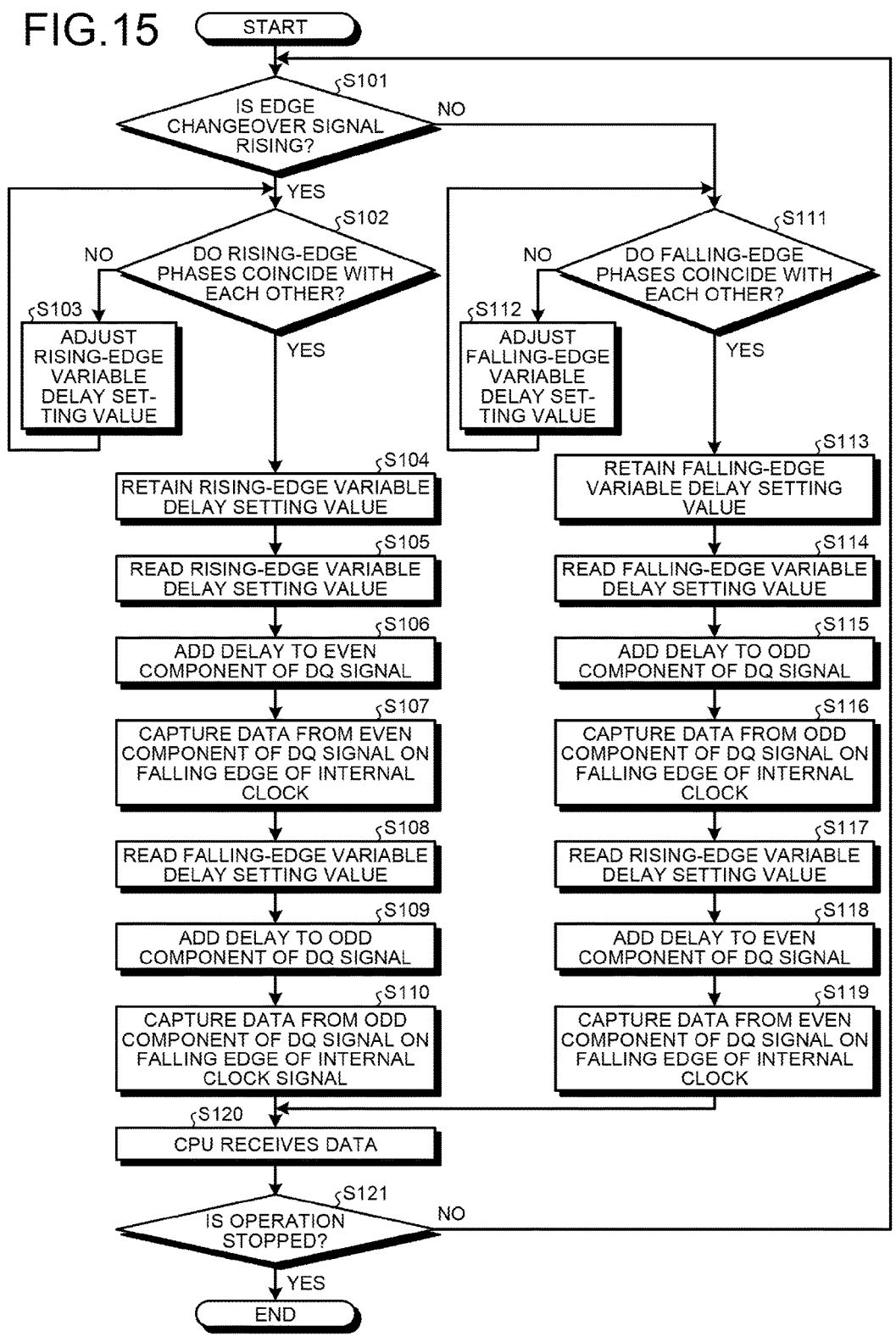

SIGNAL CONTROL CIRCUIT, INFORMATION PROCESSING APPARATUS, AND SIGNAL CONTROL METHOD

CROSS-REFERENCE TO RELATED APPLICATION

This application is based upon and claims the benefit of priority of the prior Japanese Patent Application No. 2013-227580, filed on Oct. 31, 2013, the entire contents of which are incorporated herein by reference.

FIELD

The embodiments discussed herein are related to signal control circuits, information processing apparatuses, and signal control methods.

BACKGROUND

A memory controller as a signal control circuit includes a DDR memory interface circuit represented, for example, by a double data rate three (DDR3). The DDR memory inputs and outputs data on both a positive edge and a negative edge of a clock signal, thus transferring data at a data transfer rate doubling a clock frequency.

In the DDR memory, the memory controller sends an internal clock signal generated therein to a dual inline memory module (DIMM).

In response to a read request from the memory controller, the DIMM generates a data strobe (DQS) signal from the clock signal and sends the DQS signal together with a data (DQ) signal to the memory interface.

The memory interface receives the DQS signal and the DQ signal. Next, based on phase information (edge) included in the received DQS signal, the memory interface determines optimum timing to capture the DQS signal. The memory controller then captures the DQ signal at the determined timing.

A delay that occurs midway in components through which the DQS signal and the DQ signal are sent, including the memory controller, a printed circuit board (PCB), and a memory device, varies depending on a device operating environment, such as temperature and power source voltage. This results timing at which the DQS signal or the DQ signal reaches the memory controller being varied according to changes in the device operating environment. A recent trend toward higher data transfer rates has been increasingly affecting variations in the delay. For this reason, a current practice is to determine optimum data capture timing by following the variations in the signal arriving timing.

Furthermore, a timing margin for reading the DQ signal is shrinking with the recent increasing trend toward higher-rate memory interfaces. Thus, desirably, accuracy in timing to read the DQ signal is improved.

Japanese Laid-open Patent Publication No. 2009-232366 discloses a technique that, in order to read data at appropriate timing, considers probabilities of occurrence of 0's and 1's and, based on phase shifts in, and rising and falling edges of, the data signal, adjusts a duty cycle.

Japanese Laid-open Patent Publication No. 2007-228044 discloses another technique that retains different delay amounts for rising and falling edges, respectively, of the signal, thereby assigning a different delay amount for each of the rising and falling edges.

The DQS signal may, however, be subject to duty deterioration in a level converter that converts an internal voltage of the memory controller into an external voltage or along a transmission path. The DDR memory captures the DQ signal on both the rising and falling edges of the DQS signal. If the duty deterioration occurs at this time in the DQS signal, a reduced timing margin in capturing the DQ signal results, so that a data failure may occur due to the DDR memory's failure to capture the DQ signal accurately.

Even with the use of the known technique of adjusting the duty cycle in consideration of the probabilities of occurrence of 0's and 1's, as disclosed in Japanese Laid-open Patent Publication No. 2009-232366, accurately capturing the data on the rising or falling edge of the DQS signal is difficult when the duty is deteriorated.

Similarly, even with the use of the known technique of assigning a different delay amount for each of the rising and falling edges to differentiate the delay amount of the rising edge from that of the falling edge, as disclosed in Japanese Laid-open Patent Publication No. 2007-228044, accurately capturing the data on the rising or falling edge of the DQS signal is difficult when the duty deterioration changes.

SUMMARY

According to an aspect of an embodiment, a signal control circuit includes: an acquiring unit that acquires a first signal from a data signal based on a rising edge of a reference signal and that acquires a second signal from the data signal based on a falling edge of the reference signal; a delay adding unit that gives the first signal a first delay based on a phase difference between a benchmark signal and the rising edge of the reference signal and that gives the second signal a second delay based on a phase difference between the benchmark signal and the falling edge of the reference signal; and a data capturing unit that captures, based on the benchmark signal, data from the first signal to which the first delay is given and the second signal to which the second delay is given.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14 is a diagram for illustrating a falling-edge phase determination made by the phase determining unit according to the second embodiment; and FIG. 15 is a flowchart illustrating a data capturing process performed by a memory controller according to the second embodiment.

DESCRIPTION OF EMBODIMENTS

Preferred embodiments of the present invention will be explained with reference to accompanying drawings. It is to be understood that the embodiments to be explained hereunder do not intend to limit the signal control circuits, the information processing apparatuses, and the signal control methods according to the present application.

[First Embodiment]

Figure 1:
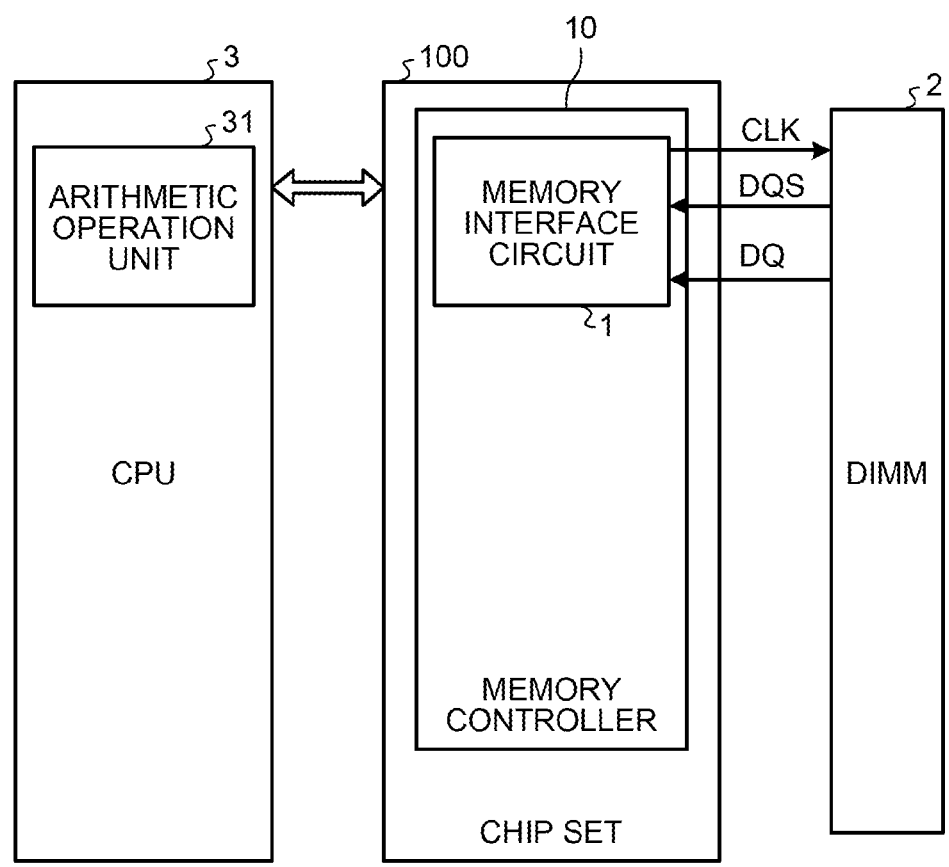
FIG. 1 is a schematic configuration diagram of an information processing apparatus.

FIG. 1 illustrates a schematic configuration of an information processing apparatus. The information processing apparatus according to a first embodiment includes a chip set 100, a dual inline memory module (DIMM) 2, and a central processing unit (CPU) 3.

A memory controller 10 is mounted on the chip set 100. The memory controller 10 includes a memory interface circuit 1.

The DIMM 2 includes a dynamic random access memory (DRAM) as a storage medium. The DIMM 2 receives a data read request and a clock signal (CLK) from the memory interface circuit 1 to be described later. The DIMM 2 generates a data strobe (DQS) signal from the received clock signal (CLK). The DIMM 2 sends the DQS signal together with a data (DQ) signal to the memory interface circuit 1.

The CPU 3 sends a read request command to read data from the DIMM 2 to the memory controller 10 on the chip set 100. The CPU 3 then receives the data specified by the read request from the memory controller 10. An arithmetic operation unit 31 of the CPU 3 thereafter performs processing of the received data.

The memory controller 10 receives the read request command from the CPU 3. The memory controller 10 then generates an internal clock signal and sends a read request together with the generated internal clock signal to the memory interface circuit 1. Thereafter, the memory controller 10 acquires data captured by the memory interface circuit 1. The memory controller 10 then sends the acquired data to the CPU 3.

The memory interface circuit 1 receives the read request from the memory controller 10. The memory interface circuit 1 further receives the internal clock signal from the memory controller 10. The memory interface circuit 1 sends a clock (CK) signal together with the read request to the DIMM 2.

Thereafter, the memory interface circuit 1 receives the data strobe (DQS) signal and the data (DQ) signal. The DQS signal is an example "reference signal".

Next, the memory interface circuit 1 gives a delay to the DQS signal to thereby synchronize with the internal clock signal. The internal clock signal is an example "benchmark signal".

Specifically, the memory interface circuit 1 gives a delay to the DQS signal such that a rising edge of the DQS signal and a rising edge of the DQS signal to which a fixed delay is given are before and after a falling edge of the internal clock signal, respectively. The memory interface circuit 1 thereby finds a delay amount that causes a rising-edge phase of the DQS signal to be aligned with a phase of the internal clock signal. This delay amount is referred to as a "rising edge-side delay amount". Similarly, the memory interface circuit 1 gives a delay to the DQS signal such that a falling edge of the DQS signal and a falling edge of the DQS signal to which a fixed delay is given are before and after the falling edge of the internal clock signal. The memory interface circuit 1 thereby finds a delay amount that causes a falling-edge phase of the DQS signal to be aligned with the phase of the internal clock signal. This delay amount is referred to as a "falling edge-side delay amount".

It is noted that the memory interface circuit 1 captures the DQ signal at two timings on the rising edge and the falling edge of the DQS signal. Specifically, the DQ signal includes a signal component captured at the timing of the rising edge of the DQS signal and a signal component captured at the timing of the falling edge of the DQS signal. Because the rising edge and the falling edge of the DQS signal alternate, the signal component captured at the timing of the rising edge of the DQS signal and the signal component captured at the timing of the falling edge of the DQS signal are repeated alternately in the DQ signal. Specifically, if one of these signal components is even-numbered data of the DQ signal, then the other of the signal components is odd-numbered data of the DQ signal. Thus, in the following, the signal component captured at the timing of the rising edge of the DQS signal will be referred to, for convenience sake, as an "EVEN component" as the even-numbered data and the signal component captured at the timing of the falling edge of the DQS signal will be referred to as an "ODD component" as the odd-numbered data.

The memory interface circuit 1 then gives the rising edge-side delay amount to the EVEN component of the DQ signal and, using the internal clock signal, captures data from the EVEN component of the DQ signal to which the rising edge-side delay amount is given. Similarly, the memory interface circuit 1 gives the falling edge-side delay amount to the ODD component of the DQ signal and, using the internal clock signal, captures data from the ODD component of the DQ signal to which the falling edge-side delay amount is given. The memory interface circuit 1 thereafter sends the captured data to the CPU 3. Converting data handled by a clock of the DQS signal to data handled by the internal clock as described above may be referred to as a "clock domain change".

Figure 2:
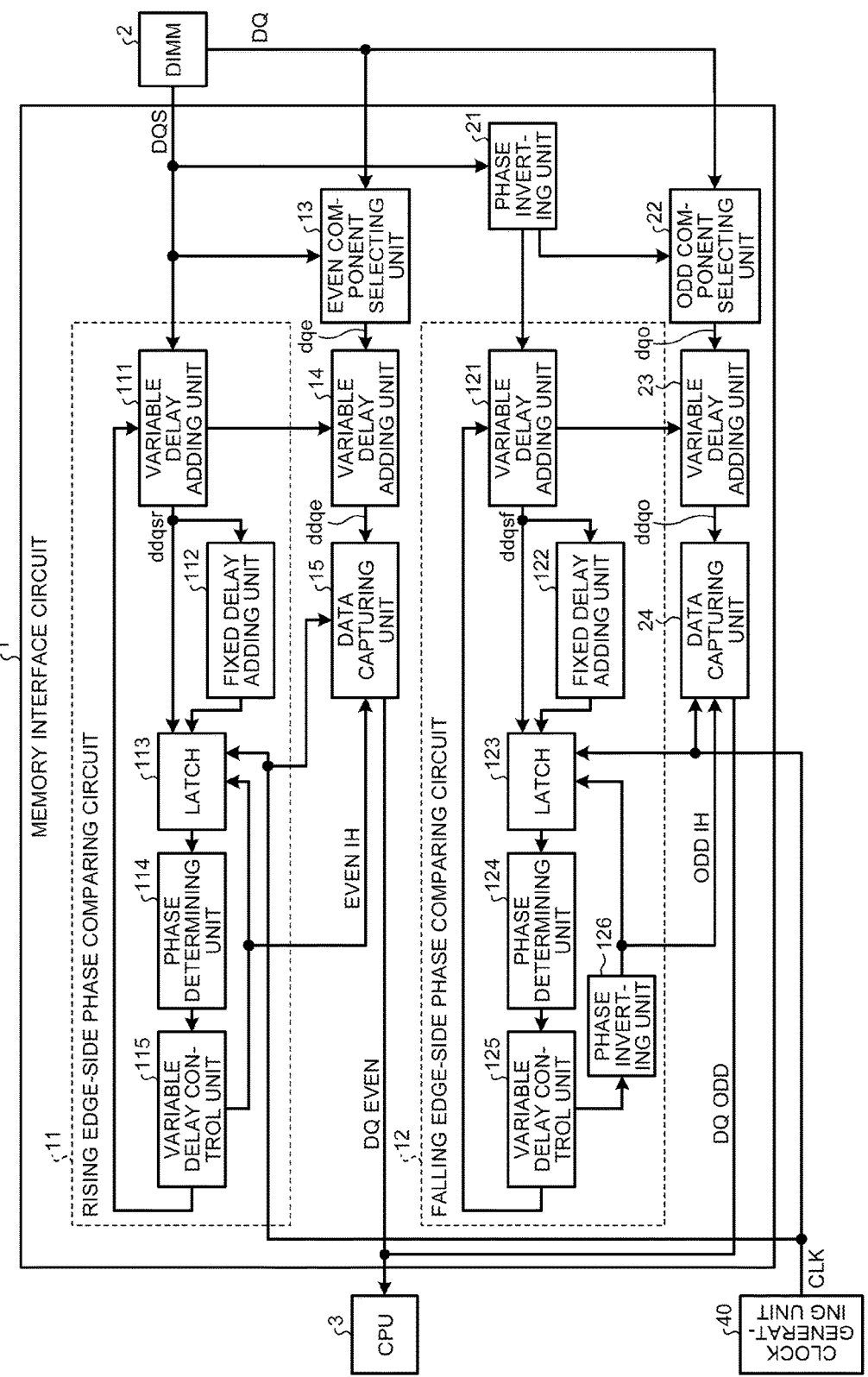
FIG. 2 is a block diagram illustrating a memory interface circuit and the information processing apparatus according to a first embodiment.

The memory interface circuit 1 according to the first embodiment will be described in detail below with reference to FIG. 2. FIG. 2 is a block diagram illustrating the memory interface circuit and the information processing apparatus according to the first embodiment. To describe functions of the clock domain change, FIG. 2 omits, for example, a function of sending the clock (CLK) signal to the DIMM 2.

As illustrated in FIG. 2, the memory interface circuit 1 according to the first embodiment includes a rising edge-side phase comparing circuit 11, an EVEN component selecting unit 13, a variable delay adding unit 14, and a data capturing unit 15. The memory interface circuit 1 further includes a falling edge-side phase comparing circuit 12, a phase inverting unit 21, an ODD component selecting unit 22, a variable delay adding unit 23, and a data capturing unit 24.

The rising edge-side phase comparing circuit 11 finds a delay amount for synchronizing the timing of the falling edge of the internal clock signal with the timing of the rising edge of the DQS signal. The rising edge-side phase comparing circuit 11 will be described in detail below.

The rising edge-side phase comparing circuit 11 includes a variable delay adding unit 111, a fixed delay adding unit 112, a latch 113, a phase determining unit 114, and a variable delay control unit 115. The rising edge-side phase comparing circuit 11 is an example "first phase difference detecting unit".

The variable delay adding unit 111 receives the DQS signal from the DIMM 2. The variable delay adding unit 111 also receives from the variable delay control unit 115 a variable delay setting value that specifies the delay amount to be given to the DQS signal. Additionally, the variable delay adding unit 111 gives the DQS signal a delay amount equivalent to the number of steps specified by the variable delay setting value. The term "step" as used herein refers to a unit in which a predetermined delay amount is given to the DQS signal. Specifically, the variable delay adding unit 111 gives, as the delay amount, the DQS signal the number of steps received from the variable delay control unit 115 multiplied by a predetermined delay amount. In the following, the delay amount given by the variable delay adding unit 111 will be referred to as a "rising-edge variable delay amount". The variable delay adding unit 111 then outputs to the latch 113 and the fixed delay adding unit 112 the DQS signal to which the rising-edge variable delay amount is given.

The fixed delay adding unit 112 receives from the variable delay adding unit 111 an input of the DQS signal to which the rising-edge variable delay amount is given. The fixed delay adding unit 112 then gives a predetermined delay amount to the DQS signal to which the rising-edge variable delay amount is given. In the following, the delay amount given by the fixed delay adding unit 112 will be referred to as a "rising-edge fixed delay amount". Thereafter, the fixed delay adding unit 112 outputs to the latch 113 the DQS signal to which the rising-edge variable delay amount and the rising-edge fixed delay amount are added.

The latch 113 receives from the variable delay adding unit 111 an input of the DQS signal to which the rising-edge variable delay amount is given. The latch 113 also receives from the fixed delay adding unit 112 an input of the DQS signal to which the rising-edge variable delay amount and the rising-edge fixed delay amount are given. In the following, the signal output from the variable delay adding unit 111 will be referred to as a "rising-edge preceding signal" and the signal output from the fixed delay adding unit 112 will be referred to as a "rising-edge following signal".

The latch 113 receives an input of the internal clock signal from a clock generating unit 40. In addition, the latch 113 receives an input of a rising-edge inhibit (IH) signal from the variable delay control unit 115.

When the rising-edge IH signal is LOW, the latch 113 captures phase information of the rising-edge preceding signal and the rising-edge following signal at a timing of the falling edge of the internal clock signal. In the first embodiment, when the signal is HIGH, the latch 113 captures the phase information as "1". When the signal is LOW, the latch 113 captures the phase information as "0". For example, when the rising-edge preceding signal is HIGH and the rising-edge following signal is LOW at the timing of the falling edge of the internal clock signal, the latch 113 captures "1" for the phase information of the rising-edge preceding signal and "0" for the phase information of the rising-edge following signal.

Figure 3:
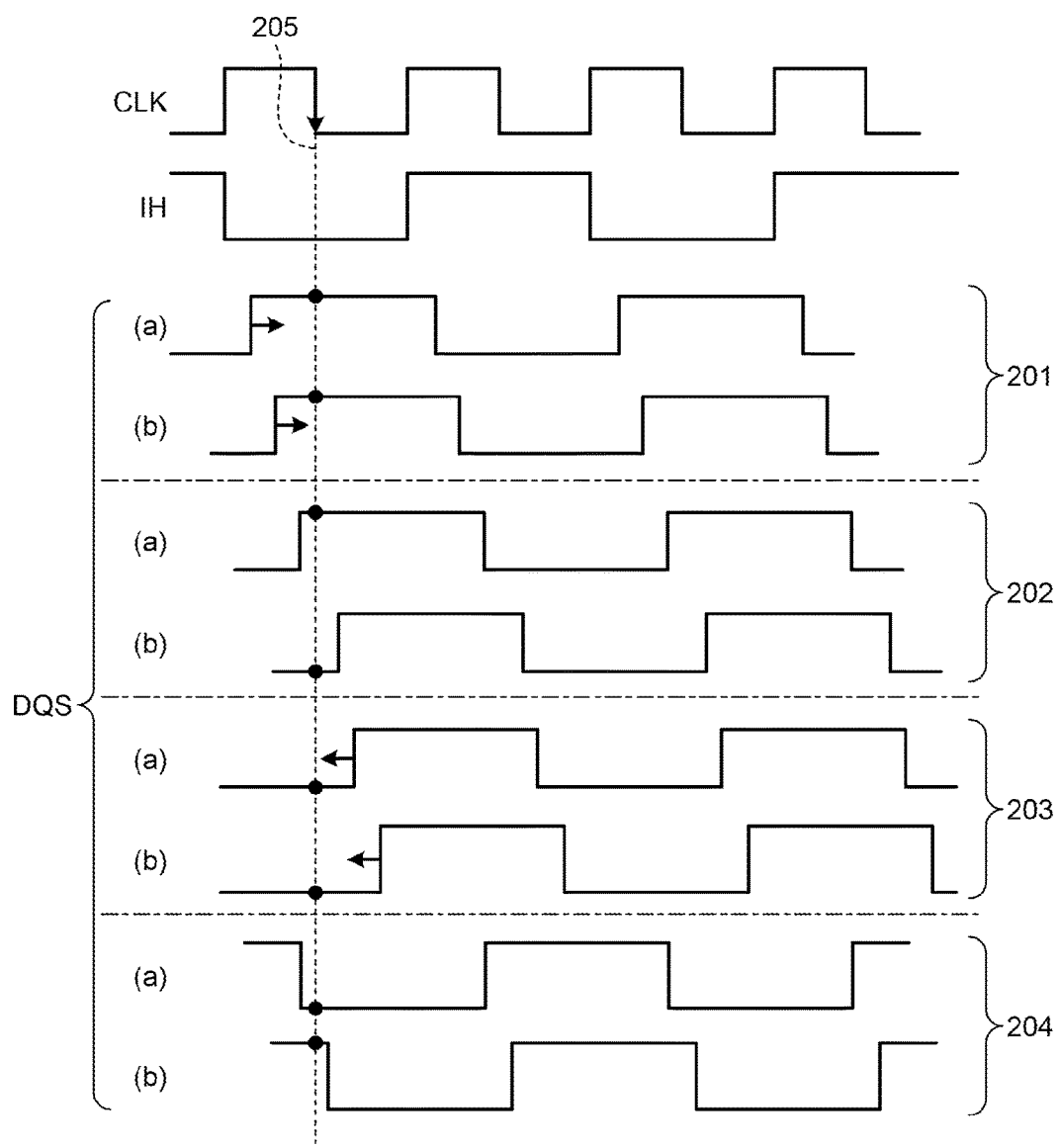
FIG. 3 is a diagram illustrating acquisition of phase information of a rising-edge preceding signal and a rising-edge following signal.

Acquisition of the phase information by the latch 113 will be described below with reference to FIG. 3. FIG. 3 illustrates the acquisition of the phase information of the rising-edge preceding signal and the rising-edge following signal. The top graph in FIG. 3 represents the internal clock signal. The second graph from the top in FIG. 3 represents the rising-edge IH signal. In each of pairs of graphs 201 to 204 in FIG. 3, each pair comprising graphs (a) and (b), graph (a) represents the rising-edge preceding signal and graph (b) represents the rising-edge following signal. The pairs of graphs 201 to 204 each indicate a condition in which the rising-edge preceding signal and the rising-edge following signal are out of phase from each other.

The latch 113 acquires values of the rising-edge preceding signal and the rising-edge following signal at a timing of the falling edge of the internal clock signal when the rising-edge IH signal is LOW. Specifically, the latch 113 acquires the values of the rising-edge preceding signal and the rising-edge following signal at a timing 205.

For the pair of graphs 201, both the rising-edge preceding signal and the rising-edge following signal are HIGH and the latch 113 acquires "1" for the phase information for each of the rising-edge preceding signal and the rising-edge following signal. For the pair of graphs 202, the rising-edge preceding signal is HIGH and the rising-edge following signal is LOW. Specifically, the latch 113 acquires "1" for the phase information of the rising-edge preceding signal and "0" for the phase information of the rising-edge following signal. For the pair of graphs 203, both the rising-edge preceding signal and the rising-edge following signal are LOW and the latch 113 acquires "0" for the phase information for each of the rising-edge preceding signal and the rising-edge following signal. For the pair of graph 204, the rising-edge preceding signal is LOW and the rising-edge following signal is HIGH. Specifically, the latch 113 acquires "0" for the phase information of the rising-edge preceding signal and "1" for the phase information of the rising-edge following signal.

The latch 113 then outputs the phase information of the rising-edge preceding signal and the rising-edge following signal to the phase determining unit 114.

Figure 4:
FIG. 4 is an example phase determining table.

The phase determining unit 114 stores therein phase conditions associated with each combination of the phase information. For example, the phase determining unit 114 stores therein a phase determining table 210 illustrated in FIG. 4. FIG. 4 is an example phase determining table. In FIG. 4, the phase information is represented by 2-bit data. Of the 2 bits of the phase information, the high-order bit represents the value of the rising-edge following signal and the low-order bit represents the value of the rising-edge preceding signal.

The phase determining unit 114 receives an input of the phase information of the rising-edge preceding signal and the rising-edge following signal from the latch 113. The phase determining unit 114 then acquires from the phase determining table 210 the phase condition associated with the combination of the received phase information. The phase determining unit 114 thereafter outputs the acquired phase condition to the variable delay control unit 115. In the following, the phase condition in which the phase of the DQS signal is delayed relative to the phase of the internal clock signal is referred to as a "phase delayed condition". Alternatively, the phase condition in which the phase of the DQS signal is advanced relative to the phase of the internal clock signal is referred to as a "phase advanced condition". The phase condition in which the phase of the DQS signal coincides with the phase of the internal clock signal is referred to as a "phase coincident condition". The condition in which the phase of the DQS signal and the phase of the internal clock signal are faulty, which will not occur in a normal situation, is referred to as a "phase faulty condition".

The variable delay control unit 115 receives an input of the phase condition from the phase determining unit 114. When the phase condition is the phase delayed condition, the variable delay control unit 115 finds a variable delay setting value that advances the phase of the DQS signal one step. Specifically, the variable delay control unit 115 sets the number of steps notified to the variable delay adding unit 111 less 1 as the variable delay setting value. The variable delay control unit 115 then sends the found variable delay setting value to the variable delay adding unit 111.

When the phase condition is the phase advanced condition, the variable delay control unit 115 finds a variable delay setting value that delays the phase of the current DQS signal by a predetermined one step. Specifically, the variable delay control unit 115 sets the number of steps notified to the variable delay adding unit 111 plus 1 as the variable delay setting value. The variable delay control unit 115 then sends the variable delay setting value found through the foregoing process to the variable delay adding unit 111.

When the phase condition is the phase coincident condition, the variable delay control unit 115 sends to the variable delay adding unit 111 an instruction to retain the variable delay setting value.

In contrast, when the phase condition is the phase faulty condition, the variable delay control unit 115 does not adjust the phase of the DQS signal.

Additionally, the variable delay control unit 115 generates an IH signal from the phase information of the rising-edge preceding signal and the rising-edge following signal and outputs the rising-edge IH signal to the latch 113.

The EVEN component selecting unit 13 receives an input of the DQ signal from the DIMM 2. Additionally the EVEN component selecting unit 13 receives an input of the DQS signal from the DIMM 2.

The EVEN component selecting unit 13 acquires an EVEN component from the DQ signal at a timing of the rising edge of the DQS signal. The EVEN component selecting unit 13 thereafter outputs the acquired EVEN component of the DQ signal to the variable delay adding unit 14. The EVEN component selecting unit 13 is an example "acquiring unit".

The variable delay adding unit 14 acquires from the variable delay adding unit 111 a rising-edge variable delay amount for setting the phase coincident condition.

The variable delay adding unit 14 receives an input of the EVEN component of the DQ signal from the EVEN component selecting unit 13.

Then, the variable delay adding unit 14 adds the rising edge-side delay amount as the rising-edge variable delay amount for setting the phase coincident condition to the EVEN component of the DQ signal. Thereafter, the variable delay adding unit 14 sends to the data capturing unit 15 the EVEN component of the DQ signal to which the rising edge-side delay amount is added. The variable delay adding unit 14 is an example "first delay adding unit". The rising edge-side delay amount is an example "first delay".

The data capturing unit 15 receives from the variable delay adding unit 14 an input of the EVEN component of the DQ signal to which the rising edge-side delay amount is added. The data capturing unit 15 also receives an input of the rising-edge IH signal from the variable delay control unit 115. In addition, the data capturing unit 15 receives an input of the internal clock signal from the clock generating unit 40.

The data capturing unit 15 captures data from the EVEN component of the DQ signal at a timing of the falling edge of the internal clock signal while the rising-edge IH signal remains LOW. Thereafter, the data capturing unit 15 outputs the data captured from the EVEN component of the DQ signal to the CPU 3.

Phase adjustments on the falling edge side will be described below. The phase inverting unit 21 receives an input of the DQS signal from the DIMM 2. The phase inverting unit 21 then inverts the phase of the DQS signal. The phase inverting unit 21 outputs the phase-inverted DQS signal to a variable delay adding unit 121 and the ODD component selecting unit 22. In the following, the DQS signal having an inverted phase will be referred to as an "inverted DQS signal".

The falling edge-side phase comparing circuit 12 finds a delay amount for synchronizing the timing of the falling edge of the internal clock signal with the timing of the falling edge of the DQS signal. The falling edge-side phase comparing circuit 12 will be described in detail below.

The falling edge-side phase comparing circuit 12 includes the variable delay adding unit 121, a fixed delay adding unit 122, a latch 123, a phase determining unit 124, a variable delay control unit 125, and a phase inverting unit 126. The falling edge-side phase comparing circuit 12 is an example "second phase difference detecting unit".

The variable delay adding unit 121 receives the inverted DQS signal from the phase inverting unit 21. The variable delay adding unit 121 also receives from the variable delay control unit 125 a variable delay setting value that specifies the delay amount to be given to the inverted DQS signal. Additionally, the variable delay adding unit 121 gives the inverted DQS signal a delay amount equivalent to the number of steps specified by the variable delay setting value. In the following, the delay amount given by the variable delay adding unit 121 will be referred to as a "falling-edge variable delay amount". The variable delay adding unit 121 then outputs to the latch 123 and the fixed delay adding unit 122 the inverted DQS signal to which the falling-edge variable delay amount is given.

The fixed delay adding unit 122 receives from the variable delay adding unit 121 an input of the inverted DQS signal to which the falling-edge variable delay amount is given. The fixed delay adding unit 122 then gives a predetermined delay amount to the inverted DQS signal to which the falling-edge variable delay amount is given. In the following, the delay amount given by the fixed delay adding unit 122 will be referred to as a "falling-edge fixed delay amount". Thereafter, the fixed delay adding unit 122 outputs to the latch 123 the inverted DQS signal to which the falling-edge variable delay amount and the falling-edge fixed delay amount are added.

The latch 123 receives from the variable delay adding unit 121 an input of the inverted DQS signal to which the falling-edge variable delay amount is given. The latch 123 also receives from the fixed delay adding unit 122 an input of the inverted DQS signal to which the falling-edge variable delay amount and the falling-edge fixed delay amount are given. In the following, the signal output from the variable delay adding unit 121 will be referred to as a "falling-edge preceding signal" and the signal output from the fixed delay adding unit 122 will be referred to as a "falling-edge following signal".

The latch 123 receives an input of the internal clock signal from the clock generating unit 40. In addition, the latch 123 receives an input of a falling-edge IH signal from the phase inverting unit 126. The falling-edge IH signal is the rising-edge IH signal output by the variable delay control unit 125 to be described later having its phase inverted.

When the falling-edge IH signal is LOW, the latch 123 captures phase information of the falling-edge preceding signal and the falling-edge following signal at a timing of the falling edge of the internal clock signal. In the first embodiment, when the signal is HIGH, the latch 123 captures the phase information as "1". When the signal is LOW, the latch 123 captures the phase information as "0". For example, when the falling-edge preceding signal is HIGH and the falling-edge following signal is LOW at the timing of the falling edge of the internal clock signal, the latch 123 captures "1" for the phase information of the falling-edge preceding signal and "0" for the phase information of the falling-edge following signal.

The inverted DQS signal used by the latch 123 has a phase inverted from the phase of the DQS signal used by the latch 113. The falling-edge IH signal used by the latch 123 has a phase inverted from the phase of the IH signal generated by the variable delay control unit 125, as will be described later. Specifically, the latch 123 can acquire the phase condition of the falling edge of the DQS signal by acquiring the phase condition of the rising edge of the inverted DQS signal at a timing of the falling edge of the internal clock signal when the falling-edge IH signal remains LOW.

Figure 5:
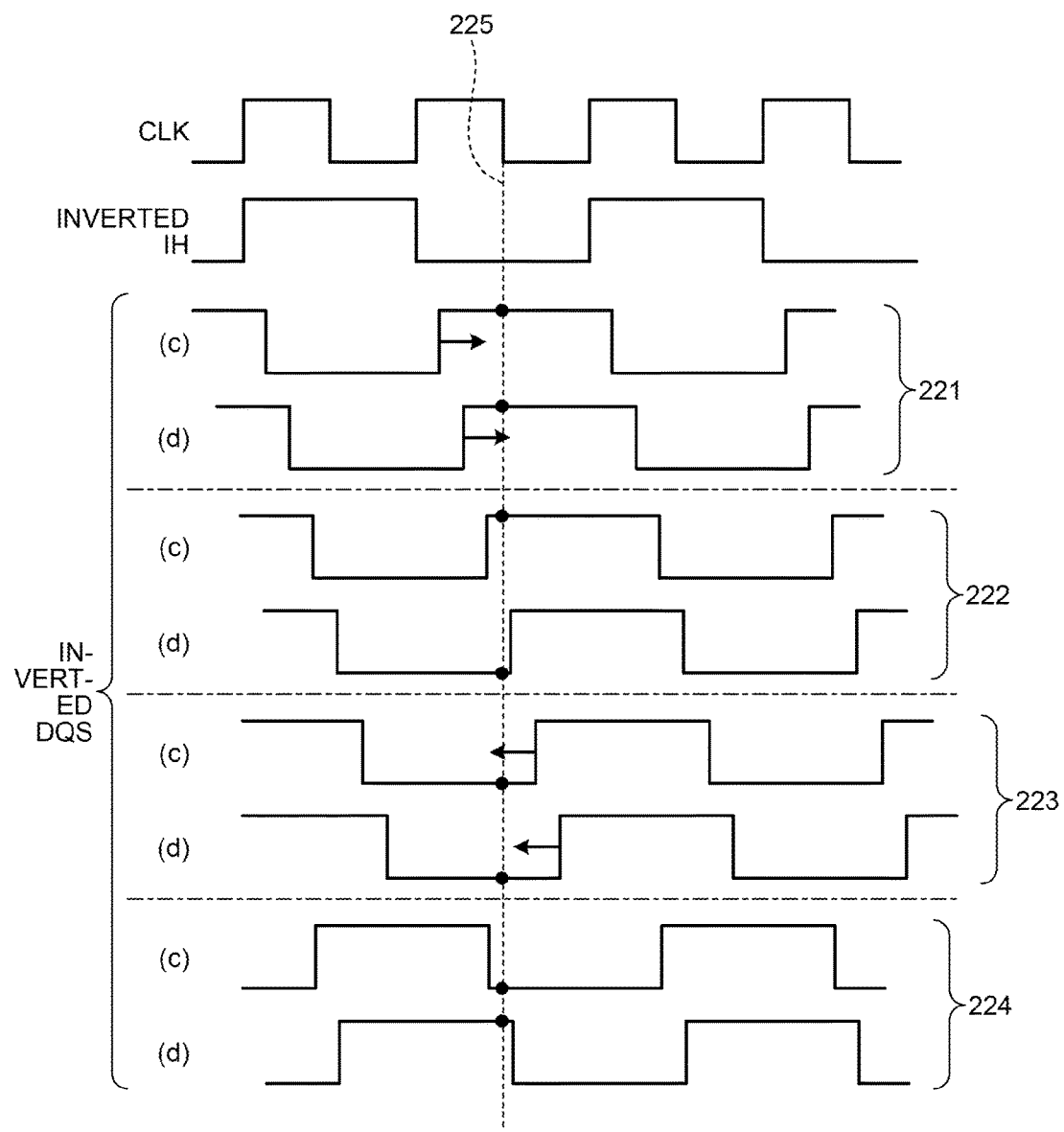
FIG. 5 is a diagram illustrating acquisition of phase information of a falling-edge preceding signal and a falling-edge following signal.

Acquisition of the phase information by the latch 123 will be described below with reference to FIG. 5. FIG. 5 illustrates the acquisition of the phase information of the falling-edge preceding signal and the falling-edge following signal. The top graph in FIG. 5 represents the internal clock signal. The second graph from the top in FIG. 5 represents the falling-edge IH signal. In each of pairs of graphs 221 to 224 in FIG. 5, each pair comprising graphs (c) and (d), graph (c) represents the falling-edge preceding signal and graph (d) represents the falling-edge following signal. The pairs of graphs 221 to 224 each indicate a condition in which the falling-edge preceding signal and the falling-edge following signal are out of phase from each other.

The latch 123 acquires values of the falling-edge preceding signal and the falling-edge following signal at a timing of the falling edge of the internal clock signal when the IH signal is LOW. Specifically, the latch 123 acquires the values of the falling-edge preceding signal and the falling-edge following signal at a timing 225.

For the pair of graphs 221, both the falling-edge preceding signal and the falling-edge following signal are HIGH and the latch 123 acquires "1" for the phase information of both the falling-edge preceding signal and the falling-edge following signal. For the pair of graphs 222, the falling-edge preceding signal is HIGH and the falling-edge following signal is LOW. Specifically, the latch 123 acquires "1" for the phase information of the falling-edge preceding signal and "0" for the phase information of the falling-edge following signal. For the pair of graphs 223, both the falling-edge preceding signal and the falling-edge following signal are LOW and the latch 123 acquires "0" for the phase information of both the falling-edge preceding signal and the falling-edge following signal. With the pair of graph 224, the falling-edge preceding signal is LOW and the falling-edge following signal is HIGH. Specifically, the latch 123 acquires "0" for the phase information of the falling-edge preceding signal and "1" for the phase information of the falling-edge following signal.

The latch 123 then outputs the phase information of the falling-edge preceding signal and the falling-edge following signal to the phase determining unit 124.

The phase determining unit 124 stores therein phase conditions associated with different combinations of the phase information. For example, the phase determining unit 124 also stores therein the phase determining table 210 illustrated in FIG. 4. As described earlier, the inverted DQS signal has a phase inverted from the phase of the DQS signal, and the falling-edge IH signal has a phase inverted from the phase of the IH signal generated by the variable delay control unit 125. Thus, the phase determining unit 124 follows determination logic that uses the phase information of the falling-edge preceding signal and the falling-edge following signal, that is identical to determination logic followed by the phase determining unit 114. Having the identical determination logic as described above shortens circuit design time.

Similar operations are nonetheless enabled by not inverting the phase of the DQS signal or the rising-edge IH signal and by using as the falling-edge determination logic to be followed by the phase determining unit 124 a phase determining table different from that of the rising-edge determination logic. For example, the falling-edge phase determining table has determination logic that results in the "phase advanced condition" when the two-bit phase information of the falling-edge preceding signal and the falling-edge following signal reads "00", the "phase coincident condition" when the two-bit phase information of the falling-edge preceding signal and the falling-edge following signal reads "10", the "phase delayed condition" when the two-bit phase information of the falling-edge preceding signal and the falling-edge following signal reads "11", and the "phase faulty condition" when the two-bit phase information of the falling-edge preceding signal and the falling-edge following signal reads "01".

The phase determining unit 124 receives an input of the phase information of the falling-edge preceding signal and the falling-edge following signal from the latch 123. The phase determining unit 124 then acquires from the phase determining table 210 the phase condition associated with the combination of the received phase information. The phase determining unit 124 thereafter outputs the acquired phase condition to the variable delay control unit 125.

The variable delay control unit 125 receives an input of the phase condition from the phase determining unit 124. When the phase condition is the phase delayed condition, the variable delay control unit 125 finds a variable delay setting value that advances the phase of the inverted DQS signal one step. Specifically, the variable delay control unit 125 sets the number of steps notified to the variable delay adding unit 121 less 1 as the variable delay setting value. The variable delay control unit 125 then sends the found variable delay setting value to the variable delay adding unit 121.

When the phase condition is the phase advanced condition, the variable delay control unit 125 finds a variable delay setting value that delays the phase of the current inverted DQS signal further by one step. Specifically, the variable delay control unit 125 sets the number of steps notified to the variable delay adding unit 121 plus 1 as the variable delay setting value. The variable delay control unit 125 then sends the variable delay setting value found through the foregoing process to the variable delay adding unit 121.

When the phase condition is the phase coincident condition, the variable delay control unit 125 sends to the variable delay adding unit 121 an instruction to retain the variable delay setting value.

In contrast, when the phase condition is the phase faulty condition, the variable delay control unit 125 does not adjust the phase of the inverted DQS signal.

Additionally, the variable delay control unit 125 generates an IH signal from the phase information of the falling-edge preceding signal and the falling-edge following signal and outputs the IH signal to the phase inverting unit 126.

The phase inverting unit 126 receives an input of the falling-edge IH signal from the variable delay control unit 125. The phase inverting unit 126 then inverts the phase of the received falling-edge IH signal. The phase inverting unit 126 outputs the falling-edge IH signal with its phase inverted to the latch 123 and the data capturing unit 24.

The ODD component selecting unit 22 receives an input of the DQ signal from the DIMM 2. Additionally the ODD component selecting unit 22 receives an input of the inverted DQS signal from the phase inverting unit 21.

The ODD component selecting unit 22 acquires an ODD component from the DQ signal at a timing of the rising edge of the inverted DQS signal. The ODD component selecting unit 22 thereafter outputs the acquired ODD component of the DQ signal to the variable delay adding unit 23. The ODD component selecting unit 22 is an example "acquiring unit".

The variable delay adding unit 23 acquires from the variable delay adding unit 121 the falling edge-side delay amount that is the falling-edge variable delay amount resulting in the phase condition in which the phase of the rising edge of the inverted DQS signal coincides with the phase of the falling edge of the internal clock signal. To state the foregoing differently, the variable delay adding unit 23 acquires from the variable delay adding unit 121 the falling-edge variable delay amount that results in the phase condition in which the phase of the falling edge of the DQS signal coincides with the phase of the falling edge of the internal clock signal. In the following, the phase condition in which the phase of the falling edge of the DQS signal coincides with the phase of the falling edge of the internal clock signal will be referred to as the "phase coincident condition".

The variable delay adding unit 23 receives an input of the ODD component of the DQ signal from the ODD component selecting unit 22.

Then, the variable delay adding unit 23 adds the falling edge-side delay amount to the ODD component of the DQ signal. Thereafter, the variable delay adding unit 23 sends to the data capturing unit 24 the ODD component of the DQ signal to which the falling edge-side delay amount is added. The variable delay adding unit 23 is an example "second delay adding unit". The falling edge-side delay amount is an example "second delay".

The data capturing unit 24 receives from the variable delay adding unit 23 an input of the ODD component of the DQ signal to which the falling edge-side delay amount is added. The data capturing unit 24 also receives an input of the inverted IH signal from the phase inverting unit 126. In addition, the data capturing unit 24 receives an input of the internal clock signal from the clock generating unit 40.

The data capturing unit 24 captures data from the ODD component of the DQ signal at a timing of the falling edge of the internal clock signal while the falling-edge IH signal remains LOW. Thereafter, the data capturing unit 24 outputs the data captured from the ODD component of the DQ signal to the CPU 3.

Figure 6:
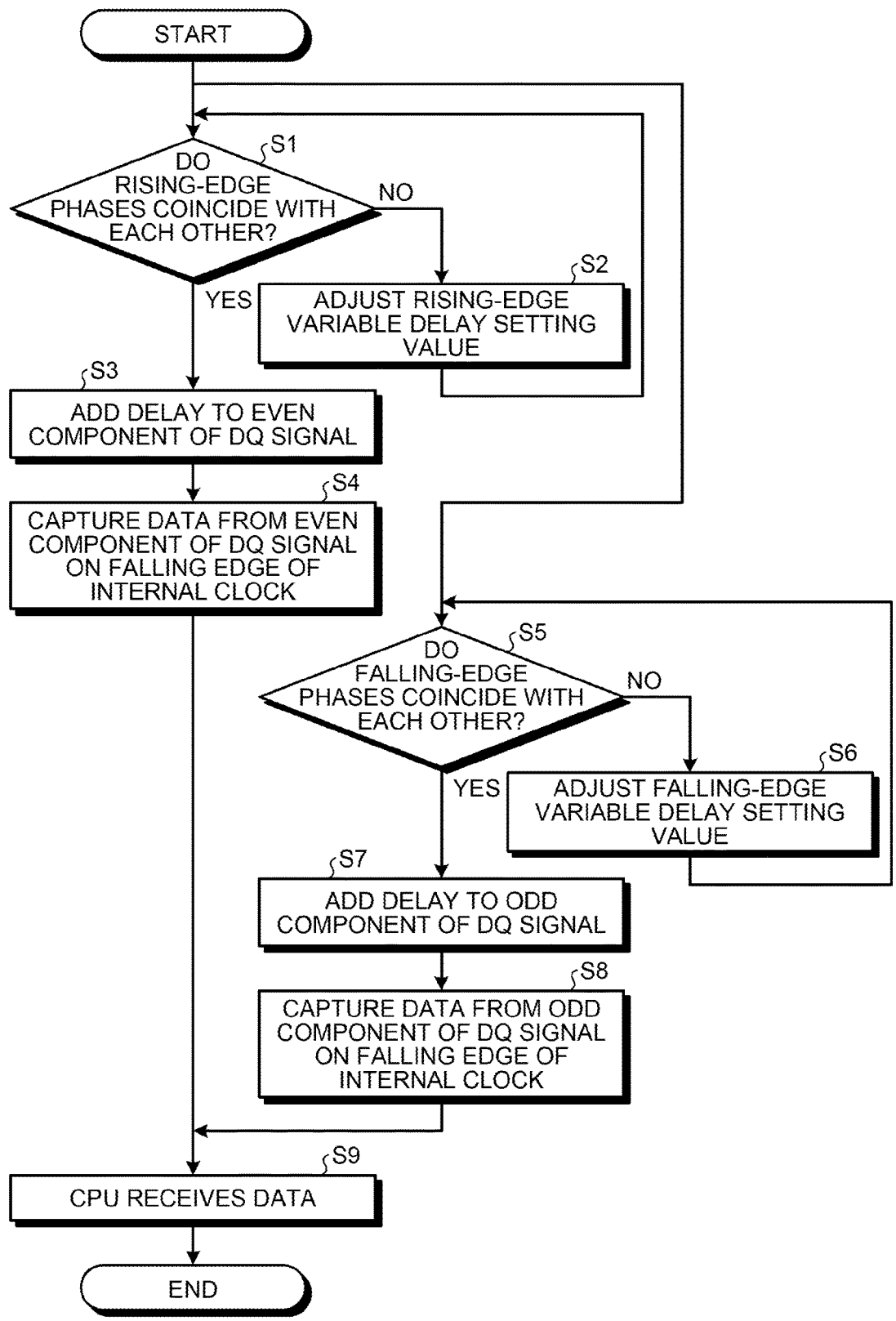
FIG. 6 is a flowchart illustrating a data capturing process performed by a memory controller according to the first embodiment.

The general data capturing process performed by the memory controller 10 according to the first embodiment will be described below with reference to FIG. 6. FIG. 6 is a flowchart illustrating the data capturing process performed by the memory controller according to the first embodiment. In the flowchart illustrated in FIG. 6, steps from S1 to S4 and S9 are a data capturing sub-process using the rising edge of the DQS signal and steps from S5 to S9 are a data capturing sub-process using the falling edge of the DQS signal. The flowchart illustrated in FIG. 6 indicates that the sub-process from steps S1 to S4 and the sub-process from steps S5 to S9 are performed concurrently with each other.

The latch 113 receives inputs of the rising-edge preceding signal and the rising-edge following signal from the variable delay adding unit 111 and the fixed delay adding unit 112. The latch 113 then acquires the phase condition of each of the rising-edge preceding signal and the rising-edge following signal. Thereafter, the latch 113 outputs the phase condition of each of the rising-edge preceding signal and the rising-edge following signal to the phase determining unit 114. From the phase condition of each of the rising-edge preceding signal and the rising-edge following signal received from the latch 113, the phase determining unit 114 determines whether the phases of the rising edges of the DQS signals coincide with each other (step S1).

If the phases do not coincide with each other (No at step S1), the variable delay control unit 115 adjusts the variable delay setting value on the rising edge (step S2). Thereafter, the rising edge-side phase comparing circuit 11 performs step S1.

If the phases coincide with each other (Yes at step S1), the variable delay adding unit 14 adds, to the EVEN component of the DQ signal, the rising-edge variable delay amount for bringing the rising edge of the DQS signal and the internal clock signal in phase with each other (step S3).

The data capturing unit 15 captures data from the EVEN component of the DQ signal to which the rising-edge variable delay amount is added at a timing of the falling edge of the internal clock signal when the rising-edge IH signal generated by the variable delay control unit 115 remains LOW (step S4).

Meanwhile, the latch 123 receives from the variable delay adding unit 121 and the fixed delay adding unit 122 inputs of the falling-edge preceding signal and the falling-edge following signal generated from the inverted DQS signal. The latch 123 then acquires the phase condition of each of the falling-edge preceding signal and the falling-edge following signal. Thereafter, the latch 123 outputs the phase condition of each of the falling-edge preceding signal and the falling-edge following signal to the phase determining unit 124. From the phase condition of each of the falling-edge preceding signal and the falling-edge following signal received from the latch 113, the phase determining unit 124 determines whether the phases of the falling edges of the DQS signals coincide with each other (step S5).

If the phases do not coincide with each other (No at step S5), the variable delay control unit 125 adjusts the variable delay setting value on the falling edge (step S6). Thereafter, the falling edge-side phase comparing circuit 12 performs step S5.

If the phases coincide with each other (Yes at step S5), the variable delay adding unit 23 adds, to the ODD component of the DQ signal, the falling-edge variable delay amount for bringing the falling edge of the DQS signal and the internal clock signal in phase with each other (step S7).

The data capturing unit 24 captures data from the ODD component of the DQ signal to which the falling-edge variable delay amount is added at a timing of the falling edge of the internal clock signal when the signal having a phase inverted from the phase of the IH signal generated by the variable delay control unit 125 remains LOW (step S8).

Thereafter, the CPU 3 acquires the data captured from the EVEN component of the DQ signal and the data captured from the ODD component of the DQ signal (step S9). This enables the CPU 3 to read data from the DIMM 2.

Figure 7:
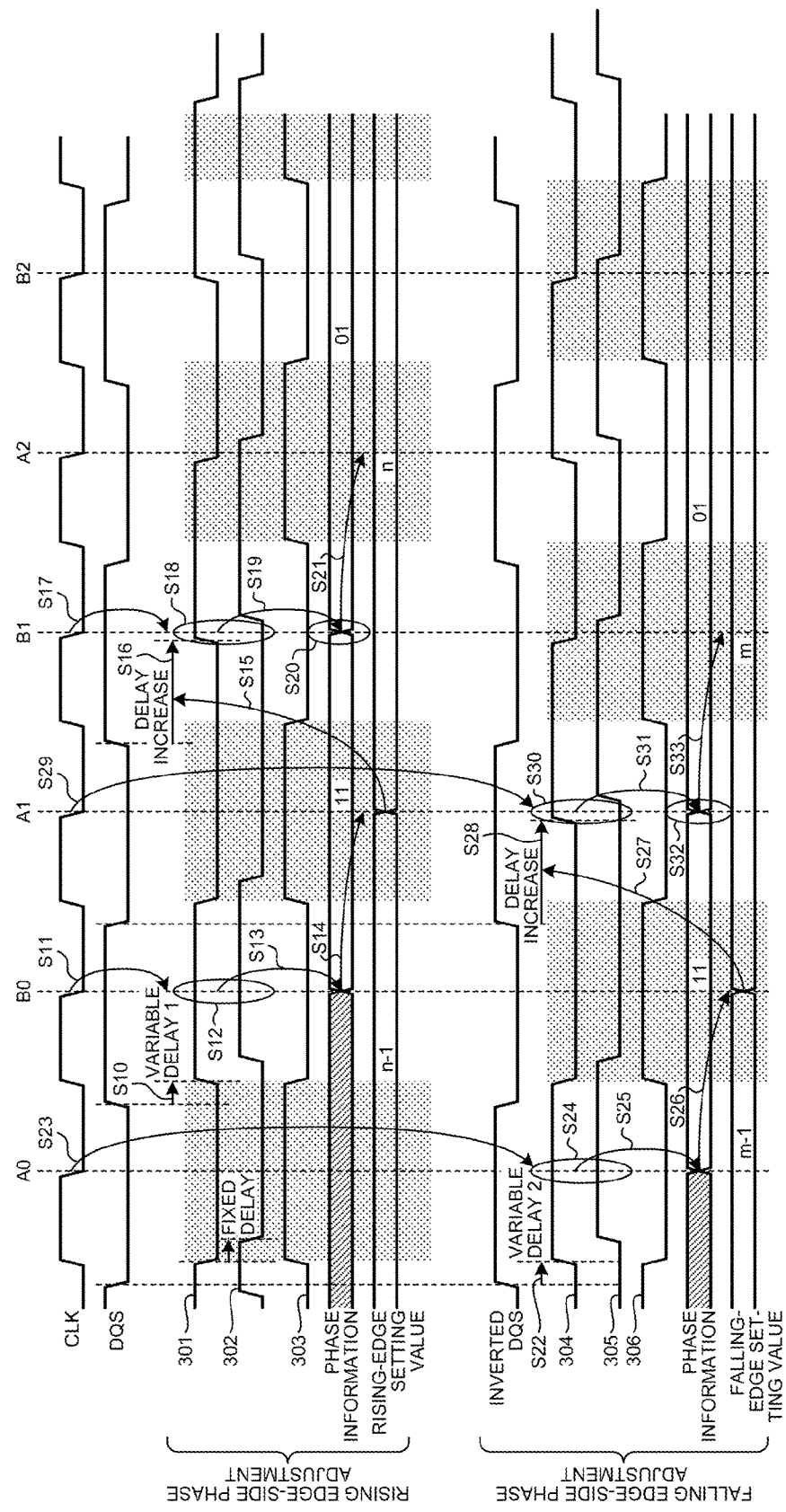
FIG. 7 is a timing chart illustrating a phase adjusting process performed when a phase of a DQS signal is advanced.

The following describes, with reference to FIG. 7, the general phase adjusting process performed when the phase of the DQS signal is advanced relative to the internal clock signal (CLK). FIG. 7 is a timing chart illustrating the phase adjusting process performed when the phase of the DQS signal is advanced.

In FIG. 7, the abscissa denotes elapsed time. CLK denotes the internal clock signal. DQS denotes the DQS signal. A signal 301 denotes the rising-edge preceding signal. A signal 302 denotes the rising-edge following signal. A signal 303 denotes the rising-edge IH signal. A rising-edge setting value denotes the variable delay setting value used for phase adjustments on the rising-edge side. An inverted DQS denotes the inverted DQS signal. A signal 304 denotes the falling-edge preceding signal. A signal 305 denotes the falling-edge following signal. A signal 306 denotes the falling-edge IH signal. A falling-edge setting value denotes the variable delay setting value used for phase adjustments on the falling-edge side.

Values for the signal 301 and the signal 302 are acquired when the rising-edge IH signal 303 remains LOW. Specifically, the latch 113 acquires the values for the signal 301 and the signal 302 at timings B0, B1, and B2. Values for the signal 304 and the signal 305 are acquired when the falling-edge IH signal 306 remains LOW. Specifically, the latch 123 acquires the values for the signal 304 and the signal 305 at timings A0, A1, and A2.

In the rising edge-side phase adjustment, the variable delay adding unit 111 gives the signal 301 a variable delay that is the variable delay setting value having a rising-edge variable delay amount for "n−1" (step S10). The signal 302 is the signal 301 to which a fixed delay is added.

The latch 113 acquires phase information by detecting a timing of the falling edge of the internal clock signal at which the signal 303 remains LOW (step S11). Specifically, at the timing B0, the latch 113 acquires values for the signal 301 and the signal 302 (step S12). In this case, the latch 113 acquires "1" as the value for the signal 301 and "1" as the value for the signal 302. The phase determining unit 114 receives from the latch 113 an input of a combination of phase information of "11" (step S13). It is noted that the combination of phase information is represented by 2-bit data. Of the 2 bits of "11", the high-order bit represents the value of the rising-edge following signal and the low-order bit represents the value of the rising-edge preceding signal. In the following, the combination of phase information of the preceding signal and the following signal may be simply referred to as "phase information".

The phase determining unit 114 determines that the phase condition is the phase advanced condition. The phase determining unit 114 then notifies the variable delay control unit 115 of the phase advanced condition (step S14). The variable delay control unit 115 adds 1 to the variable delay setting value to thereby find a new variable delay setting value. In FIG. 7, the variable delay control unit 115 adds 1 to the variable delay setting value of "n−1" to thereby find "n" for the new variable delay setting value. The variable delay control unit 115 then notifies the variable delay adding unit 111 of the newly found variable delay setting value (step S15).

The variable delay adding unit 111, having received the input of the variable delay setting value from the variable delay control unit 115, gives the DQS signal the rising-edge variable delay amount having the delay amount increased by one step (step S16). Because of the rising-edge variable delay amount increased from a value added last, the delay in the signals 301 and 302 increases.

The latch 113 acquires phase information by detecting a timing of the falling edge of the internal clock signal at which the signal 303 remains LOW (step S17). Specifically, at the timing B1, the latch 113 acquires values for the signal 301 and the signal 302 (step S18). In this case, the latch 113 acquires "1" as the value for the signal 301 and "0" as the value for the signal 302. The phase determining unit 114 receives from the latch 113 an input of a combination of phase information of "01" (step S19).

Because of the phase information being "01", the phase determining unit 114 determines that the rising-edge of the DQS signal is in phase with the internal clock signal (step S20). The phase determining unit 114 then notifies the variable delay control unit 115 of the phase coincident condition. Because of the phases being coincident with each other, the variable delay control unit 115 instructs the variable delay adding unit 14 to retain the variable delay amount (step S21).

In the falling edge-side phase adjustment, the variable delay adding unit 121 gives the signal 304 a variable delay that is the variable delay setting value having a falling-edge variable delay amount for "m−1" (step S22). The signal 305 is the signal 304 to which a fixed delay is added.

The latch 123 acquires phase information by detecting a timing of the falling edge of the internal clock signal at which the signal 306 remains LOW (step S23). Specifically, at the timing A0, the latch 123 acquires values for the signal 304 and the signal 305 (step S24). In this case, the latch 123 acquires "1" as the value for the signal 304 and "1" as the value for the signal 305. The phase determining unit 124 receives from the latch 123 phase information of "11" (step S25).

The phase determining unit 124 determines that the phase condition is the phase advanced condition. The phase determining unit 124 then notifies the variable delay control unit 125 of the phase advanced condition (step S26). The variable delay control unit 125 adds 1 to the variable delay setting value to thereby find a new variable delay setting value. In FIG. 7, the variable delay control unit 125 adds 1 to the variable delay setting value of "m−1" to thereby find "m" for the new variable delay setting value. The variable delay control unit 125 then notifies the variable delay adding unit 121 of the newly found variable delay setting value (step S27).

The variable delay adding unit 121, having received the input of the variable delay setting value from the variable delay control unit 125, gives the DQS signal the falling-edge variable delay amount having the delay amount increased by one step (step S28). Because of the falling-edge variable delay amount increased from a value added last, the delay in the signals 304 and 305 increases.

The latch 123 acquires phase information by detecting a timing of the falling edge of the internal clock signal at which the signal 306 remains LOW (step S29). Specifically, at the timing A1, the latch 123 acquires values for the signal 304 and the signal 305 (step S30). In this case, the latch 123 acquires "1" as the value for the signal 304 and "0" as the value for the signal 305. The phase determining unit 124 receives from the latch 123 an input of phase information of "01" (step S31).

Because of the phase information being "01", the phase determining unit 124 determines that the falling-edge of the DQS signal is in phase with the internal clock (step S32). The phase determining unit 124 then notifies the variable delay control unit 125 of the phase coincident condition. The variable delay control unit 125 instructs the variable delay adding unit 121 to retain the falling-edge variable delay amount (step S33).

Figure 8:
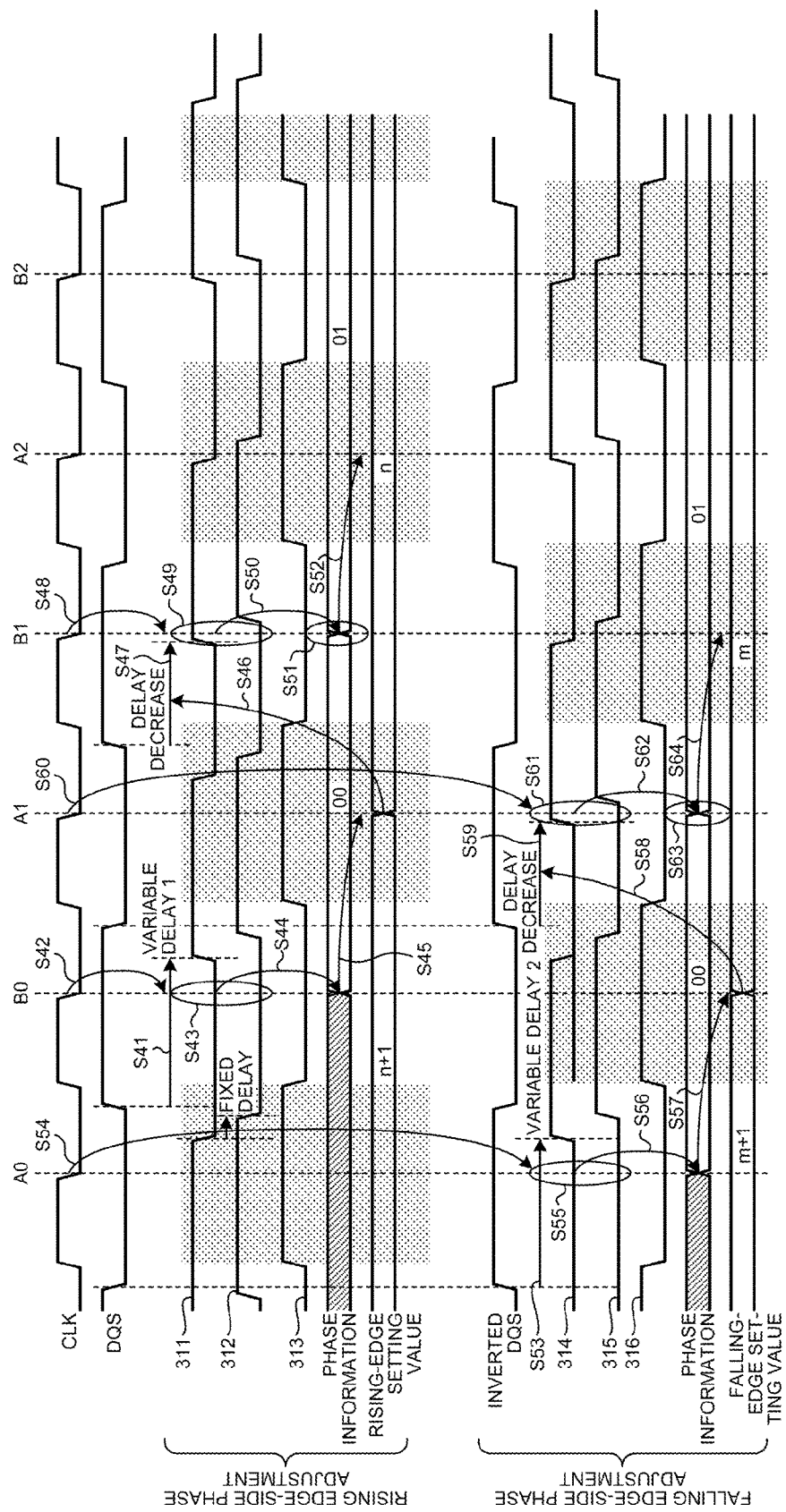
FIG. 8 is a timing chart illustrating a phase adjusting process performed when a phase of a DQS signal is delayed.

The following describes, with reference to FIG. 8, the general phase adjusting process performed when the phase of the DQS signal is delayed relative to the internal clock signal (CLK). FIG. 8 is a timing chart illustrating the phase adjusting process performed when a phase of a DQS signal is delayed.

In FIG. 8, the abscissa denotes elapsed time. A signal 311 denotes the rising-edge preceding signal. A signal 312 denotes the rising-edge following signal. A signal 313 denotes the rising-edge IH signal. A signal 314 denotes the falling-edge preceding signal. A signal 315 denotes the falling-edge following signal. A signal 316 denotes the falling-edge IH signal. Values for the signal 311 and the signal 312 are acquired when the rising-edge IH signal 313 remains LOW. Specifically, the latch 113 acquires the values for the signal 311 and the signal 312 at timings B0, B1, and B2. Values for the signal 314 and the signal 315 are acquired when the falling-edge IH signal 316 remains LOW. Specifically, the latch 123 acquires the values for the signal 314 and the signal 315 at timings A0, A1, and A2.

In the rising edge-side phase adjustment, the variable delay adding unit 111 gives the signal 311 a variable delay that is the variable delay setting value having a rising-edge variable delay amount for "n+1" (step S41). The signal 312 is the signal 311 to which a fixed delay is added.

The latch 113 acquires phase information by detecting a timing of the falling edge of the internal clock signal at which the signal 313 remains LOW (step S42). Specifically, at the timing B0, the latch 113 acquires values for the signal 311 and the signal 312 (step S43). In this case, the latch 113 acquires "0" as the value for the signal 311 and "0" as the value for the signal 312. The phase determining unit 114 receives from the latch 113 an input of phase information of "00" (step S44).

The phase determining unit 114 determines that the phase condition is the phase delayed condition. The phase determining unit 114 then notifies the variable delay control unit 115 of the phase delayed condition (step S45). The variable delay control unit 115 subtracts 1 from the variable delay setting value to thereby find a new variable delay setting value. In FIG. 8, the variable delay control unit 115 subtracts 1 from the variable delay setting value of "n+1" to thereby find "n" for the new variable delay setting value. The variable delay control unit 115 then notifies the variable delay adding unit 111 of the newly found variable delay setting value (step S46).

The variable delay adding unit 111, having received the input of the rising-edge variable delay setting value from the variable delay control unit 115, gives the DQS signal a delay having a delay amount decreased by one step (step S47). Because of the rising-edge variable delay amount decreased from a value added last, the delay in the signals 311 and 312 decreases.

The latch 113 acquires phase information by detecting a timing of the falling edge of the internal clock signal at which the signal 313 remains LOW (step S48). Specifically, at the timing B1, the latch 113 acquires values for the signal 311 and the signal 312 (step S49). In this case, the latch 113 acquires "1" as the value for the signal 311 and "0" as the value for the signal 312. The phase determining unit 114 receives from the latch 113 an input of phase information of "01" (step S50).

Because of the phase information being "01", the phase determining unit 114 determines that the phase condition is the phase coincident condition (step S51). The phase determining unit 114 then notifies the variable delay control unit 115 of the phase coincident condition. Because of the phases being coincident with each other, the variable delay control unit 115 instructs the variable delay adding unit 14 to retain the variable delay amount (step S52).

In the falling edge-side phase adjustment, the variable delay adding unit 121 gives the signal 314 a variable delay that is the variable delay amount having a falling-edge variable delay amount for "m+1" (step S53). The signal 315 is the signal 314 to which a fixed delay is added.

The latch 123 acquires phase information by detecting a timing of the falling edge of the internal clock signal at which the signal 316 remains LOW (step S54). Specifically, at the timing A0, the latch 123 acquires values for the signal 314 and the signal 315 (step S55). In this case, the latch 123 acquires "0" as the value for the signal 314 and "0" as the value for the signal 315. The phase determining unit 124 receives from the latch 123 phase information of "00" (step S56).

The phase determining unit 124 determines that the phase condition is the phase delayed condition. The phase determining unit 124 then notifies the variable delay control unit 125 of the phase delayed condition (step S57). The variable delay control unit 125 subtracts 1 from the variable delay setting value to thereby find a new variable delay setting value. In FIG. 8, the variable delay control unit 125 subtracts 1 from the variable delay setting value of "m+1" to thereby find "m" for the new variable delay setting value. The variable delay control unit 125 then notifies the variable delay adding unit 121 of the newly found variable delay setting value (step S58).

The variable delay adding unit 121, having received the input of the variable delay setting value from the variable delay control unit 125, gives the DQS signal the falling-edge variable delay amount having the delay amount decreased by one step (step S59). Because of the falling-edge variable delay amount decreased from a value added last, the delay in the signals 314 and 315 decreases.

The latch 123 acquires phase information by detecting a timing of the falling edge of the internal clock signal at which the signal 316 remains LOW (step S60). Specifically, at the timing A1, the latch 123 acquires values for the signal 314 and the signal 315 (step S61). In this case, the latch 123 acquires "1" as the value for the signal 314 and "0" as the value for the signal 315. The phase determining unit 124 receives from the latch 123 phase information of "01" (step S62).

Because of the phase information being "01", the phase determining unit 124 determines that the phase condition is the phase coincident condition (step S63). The phase determining unit 124 then notifies the variable delay control unit 125 of the phase coincident condition. The variable delay control unit 125 instructs the variable delay adding unit 121 to retain the falling-edge variable delay amount (step S64).

Figure 9:
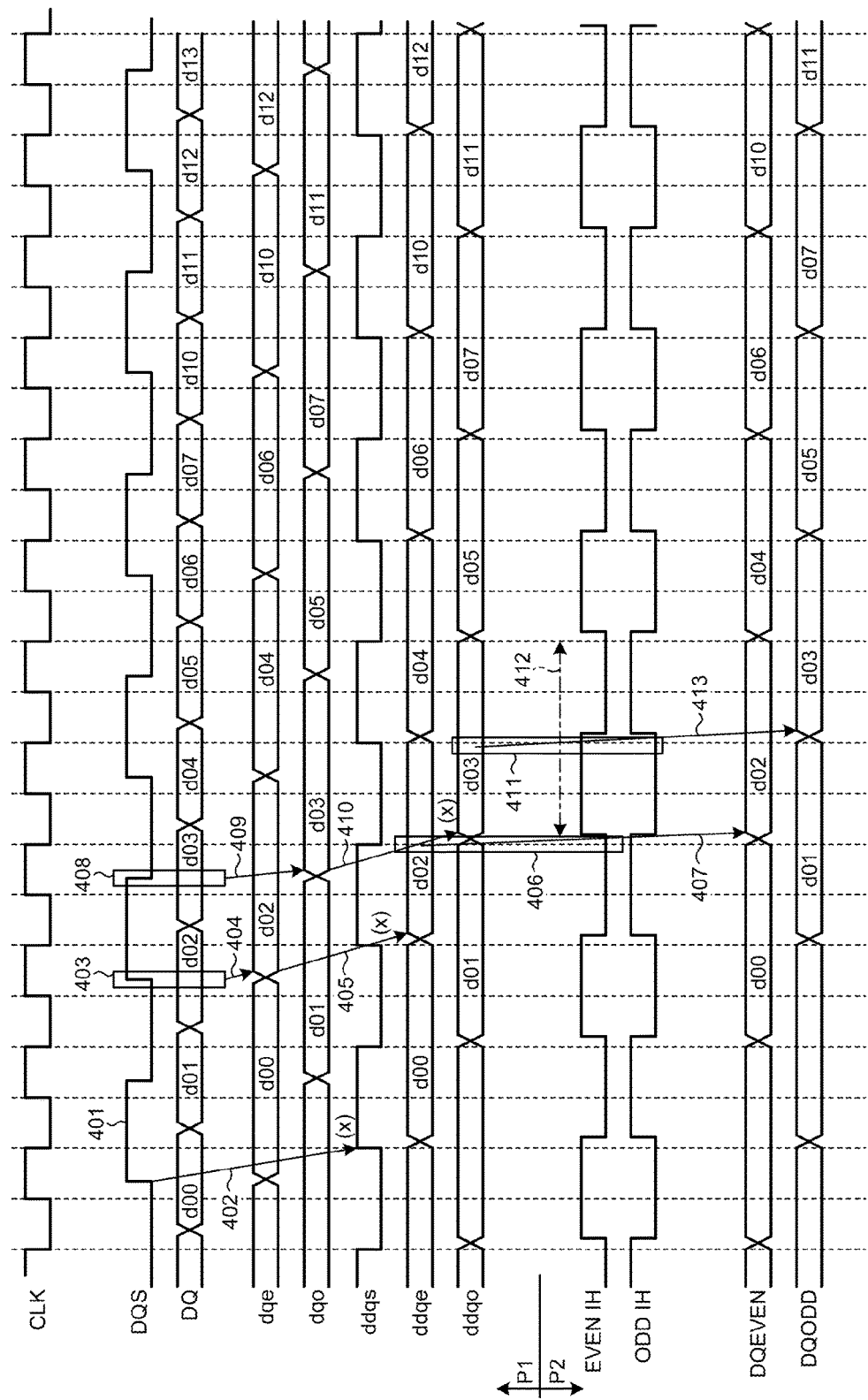
FIG. 9 is a diagram illustrating timing of respective signals when duty is not deteriorated.
Figure 10:
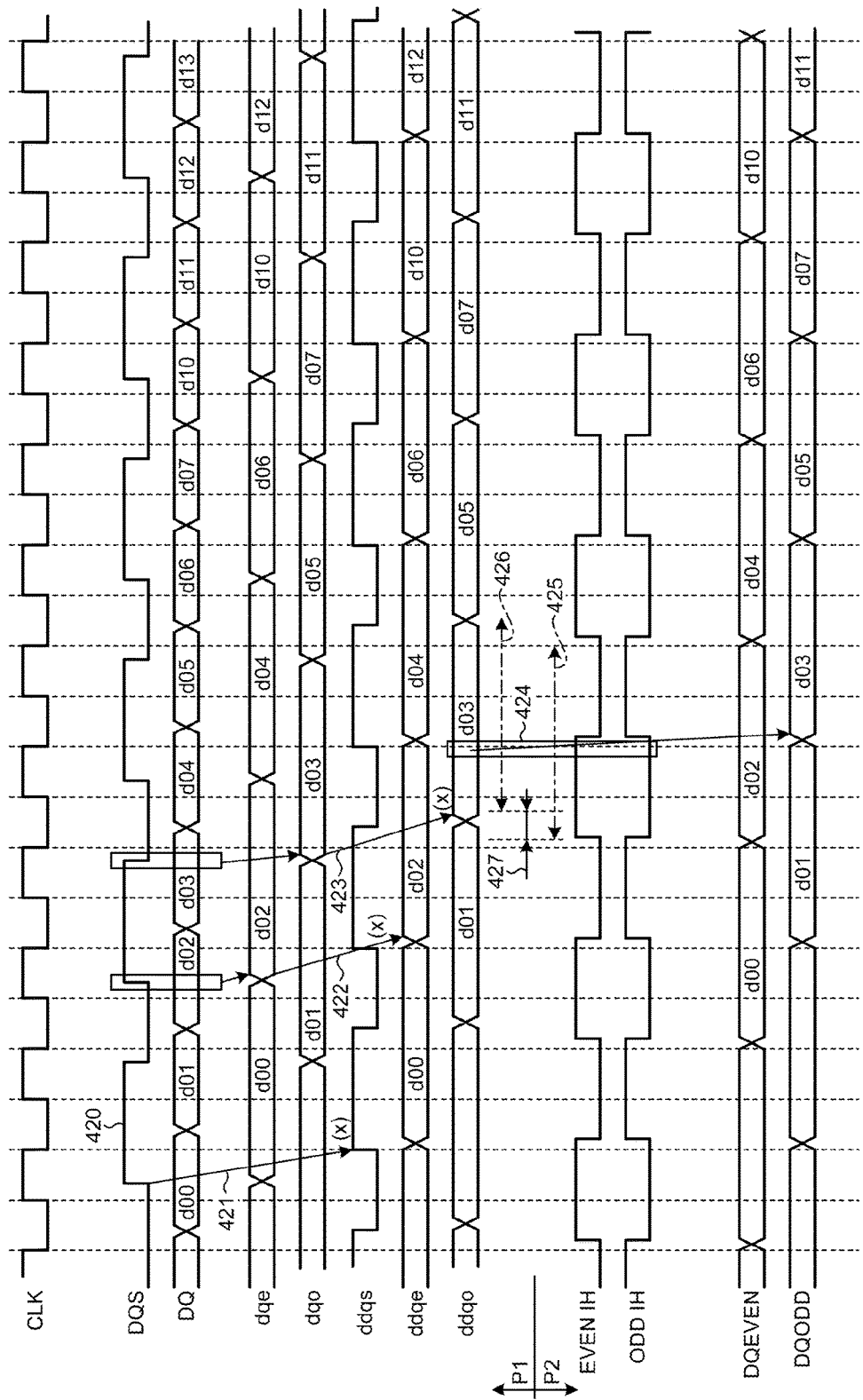
FIG. 10 is a diagram illustrating timing of respective signals when the phase is adjusted only at rising-edge timing when the duty is deteriorated.
Figure 11:
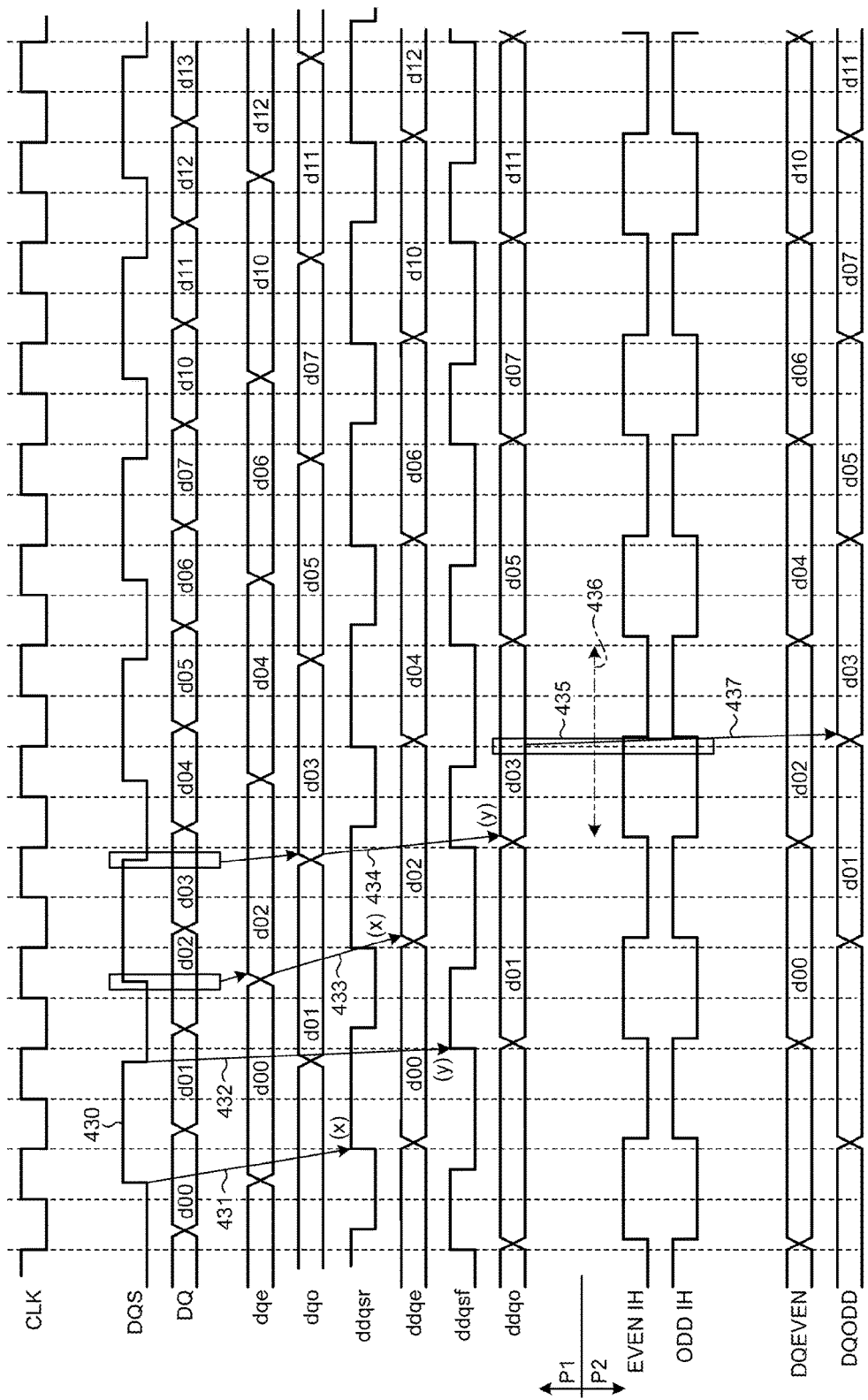
FIG. 11 is a diagram illustrating timing of respective signals when the duty is deteriorated with the memory interface circuit according to the first embodiment in use.

The following describes, with reference to FIGS. 9 to 11, how the memory interface circuit according to the first embodiment achieves a proper timing margin when duty is deteriorated. FIG. 9 is a diagram illustrating timing of respective signals when the duty is not deteriorated. FIG. 10 is a diagram illustrating timing of respective signals when the phase is adjusted only at the rising-edge timing when the duty is deteriorated. FIG. 11 is a diagram illustrating timing of respective signals when the duty is deteriorated with the memory interface circuit according to the first embodiment in use.

Referring first to FIG. 9, the condition in which the duty is not deteriorated will be described. Each graph illustrated in FIG. 9 is associated with a specific signal denoted on the left end thereof. In FIG. 9, CLK denotes the internal clock signal; DQS denotes the DQS signal; DQ denotes the DQ signal; dqe denotes the EVEN component of the DQ signal; dqo denotes the ODD component of the DQ signal; ddqs denotes a DQS signal to which a delay is added to thereby cause the phase thereof on the rising edge to coincide with the internal clock signal; ddqe denotes a dqe signal to which the same delay as that added to the DQS signal in order to cause the phase of the DQS signal on the rising edge to coincide with the internal clock signal is added; ddqo denotes a dqo signal to which the same delay as that added to the DQS signal in order to cause the phase of the DQS signal on the rising edge to coincide with the internal clock signal is added; EVEN IH denotes the rising-edge IH signal for dqe; ODD IH denotes the rising-edge IH signal for dqo; DQEVEN denotes captured data of the EVEN component of the DQ signal; and DQODD denotes captured data of the ODD component of the DQ signal.

Additionally, all signals but the internal clock signal placed above P1 are those in a DQS domain operating using the DQS signal. All signals placed below P2 operate using the internal clock signal.

The DQS signal, having no duty deterioration, exhibits an equal ratio of HIGH and LOW in each cycle as with a signal 401. Adding a delay amount X to the DQS signal is assumed to cause the DQS signal to be in phase with the internal clock signal.

The variable delay adding unit 111 adds, to the DQS signal, the delay amount X that causes the rising edge of the DQS signal to be in phase with the internal clock signal, thereby giving a delay 402 to the DQS signal to thereby generate the ddqs. Specifically, the rising edge of the ddqs is in phase with the internal clock signal.

At a timing 403, the EVEN component selecting unit 13 extracts the EVEN component of the DQ signal and generates the dqe as indicated by a transition 404. The variable delay adding unit 14 adds the delay amount X to the dqe to thereby give the dqe a delay 405, thus generating the ddqe.

Thereafter, the data capturing unit 15 captures data from the ddqe at a timing 406 of the falling edge of the internal clock signal when the falling-edge IH signal of the EVEN component of the DQ signal is LOW. As described earlier, the delay amount X is a value found to bring the rising edge of the DQS signal into phase with the internal clock signal. Thus, the ddqe associated with the EVEN component extracted on the rising edge of the DQS signal achieves an accurate timing margin. The data capturing unit 15 then acquires data captured from the ddqe as indicated by a transition 407.

The ODD component selecting unit 22 extracts the ODD component of the DQ signal at a timing 408 and generates the dqo as indicated by a transition 409. The variable delay adding unit 23 adds the delay amount X to the dqo to thereby give the dqo a delay 410, thus generating the ddqo.

Thereafter, the data capturing unit 24 captures data from the ddqe at a timing 411 of the falling edge of the internal clock signal when the falling-edge IH signal of the ODD component of the DQ signal is LOW. It is noted that, because of no duty deterioration involved, a phase difference relative to the internal clock signal on the rising edge is the same as that on the falling edge. Thus, even with the ddqo associated with the ODD component, an accurate timing margin 412 can be achieved as with the ddqe. The data capturing unit 24 then acquires data captured from the ddqe as indicated by a transition 413.

The following describes, with reference to FIG. 10, phase adjustments made only at a timing of the rising edge with the duty deterioration occurring. The signals illustrated in FIG. 10 are the same as those illustrated in FIG. 9.

In this case, the duty deterioration occurs in the DQS signal with the resultant collapsed ratio of HIGH and LOW as illustrated by a signal 420. Specifically, a phase difference relative to the internal clock signal on the rising edge of the DQS signal differs from that on the falling edge.

In this case, the variable delay adding unit 111 adds, to the DQS signal, the delay amount X that causes the rising edge of the DQS signal to be in phase with the internal clock signal, thereby giving a delay 421 to the DQS signal to thereby generate the ddqs. Specifically, the rising edge of the ddqs is in phase with the internal clock signal. Because of the phase difference involved relative to the internal clock signal between the rising edge and the falling edge of the DQS signal, however, the addition of the delay amount X results in the falling edge of the ddqs being out of phase with the internal clock signal.

The variable delay adding unit 14 adds the delay amount X to the dqe to thereby give a delay 422, thereby generating the ddqe. In this case, too, the data capturing unit 15 acquires data from the ddqe as in FIG. 9.

In contrast, the variable delay adding unit 23 adds the delay amount X to the dqo to thereby give a delay 423, thereby generating the ddqo. However, because the falling edge of the ddqs is out of phase with the internal clock signal, the ddqo generated through the addition of the delay amount X has a phase out of the optimal phase with respect to the internal clock. As a result, as compared with a timing margin 425 achieved when the ddqo has an optimum phase relative to the internal clock signal, a timing margin 426 achieved in this case results in reduction in the margin for a difference 427. A large difference in the margin makes it difficult to acquire data from the ddqo at a timing 424, resulting in a data failure.

The following describes, with reference to FIG. 11, phase adjustments made using the memory interface circuit 1 according to the first embodiment when the duty deterioration occurs. In FIG. 11, ddqsr denotes the DQS signal to which a delay is added to bring its rising edge into phase with the phase of the internal clock signal; and ddqf denotes the inverted DQS signal to which a delay is added to bring its falling edge into phase with the internal clock signal. Other signals illustrated in FIG. 11 are the same as those illustrated in FIG. 9.

In this case, the duty deterioration occurs in the DQS signal with the resultant unequal ratio of HIGH and LOW as illustrated by a signal 430. Specifically, a phase difference relative to the internal clock signal on the rising edge of the DQS signal differs from that on the falling edge.

In this case, the variable delay adding unit 111 adds, to the DQS signal, the delay amount X that causes the rising edge of the DQS signal to be in phase with the internal clock signal, thereby giving a delay 431 to the DQS signal to thereby generate the ddqsr. Specifically, the rising edge of the ddqsr is in phase with the internal clock signal.

The variable delay adding unit 14 adds the delay amount X to the dqe to thereby give a delay 433, thereby generating the ddqe. In this case, too, the data capturing unit 15 acquires data from the ddqe as in FIG. 9.

In contrast, the variable delay adding unit 121 adds, to the inverted DQS signal, a delay amount Y that causes the falling edge of the DQS signal to be in phase with the internal clock signal, thereby giving a delay 432 to generate the ddqsf. Specifically, the rising edge of the ddqsf is in phase with the internal clock signal.

The variable delay adding unit 23 adds the delay amount Y to the dqo to thereby give a delay 434, thereby generating the ddqo. It is noted that the delay amount Y is obtained by bringing the rising edge of the inverted DQS signal into phase with the internal clock signal. Thus, an accurate timing margin 436 is achieved in the ddqo associated with the ODD component extracted on the falling edge of the DQS signal. The data capturing unit 15 captures data at a timing 435 to thereby acquire data captured from the ddqe as indicated by a transition 437.

As described heretofore, the memory interface circuit according to the first embodiment obtains a delay when the DQS signal and the internal clock signal are brought into phase with each other using the rising edge of the DQS signal. The memory interface circuit according to the first embodiment then gives the obtained delay to the signal component of the DQ signal captured on the rising edge of the DQS signal, thereby capturing data using the internal clock signal. In addition, the memory interface circuit according to the first embodiment obtains a delay when the DQS signal and the internal clock signal are brought into phase with each other using the falling edge of the DQS signal. The memory interface circuit according to the first embodiment then gives the obtained delay to the signal component of the DQ signal captured on the falling edge of the DQS signal, thereby capturing data using the internal clock signal.

This enables the timing at which to capture the DQ signal can be appropriately adjusted even when the duty deterioration occurs in the DQS signal. Specifically, reduction in the timing margin can be mitigated and occurrence of data failures can be mitigated. To state the foregoing differently, a clock domain change can be made at an optimum phase on each of the rising edge and the falling edge of the DQS signal.

[Second Embodiment]

Figure 12:
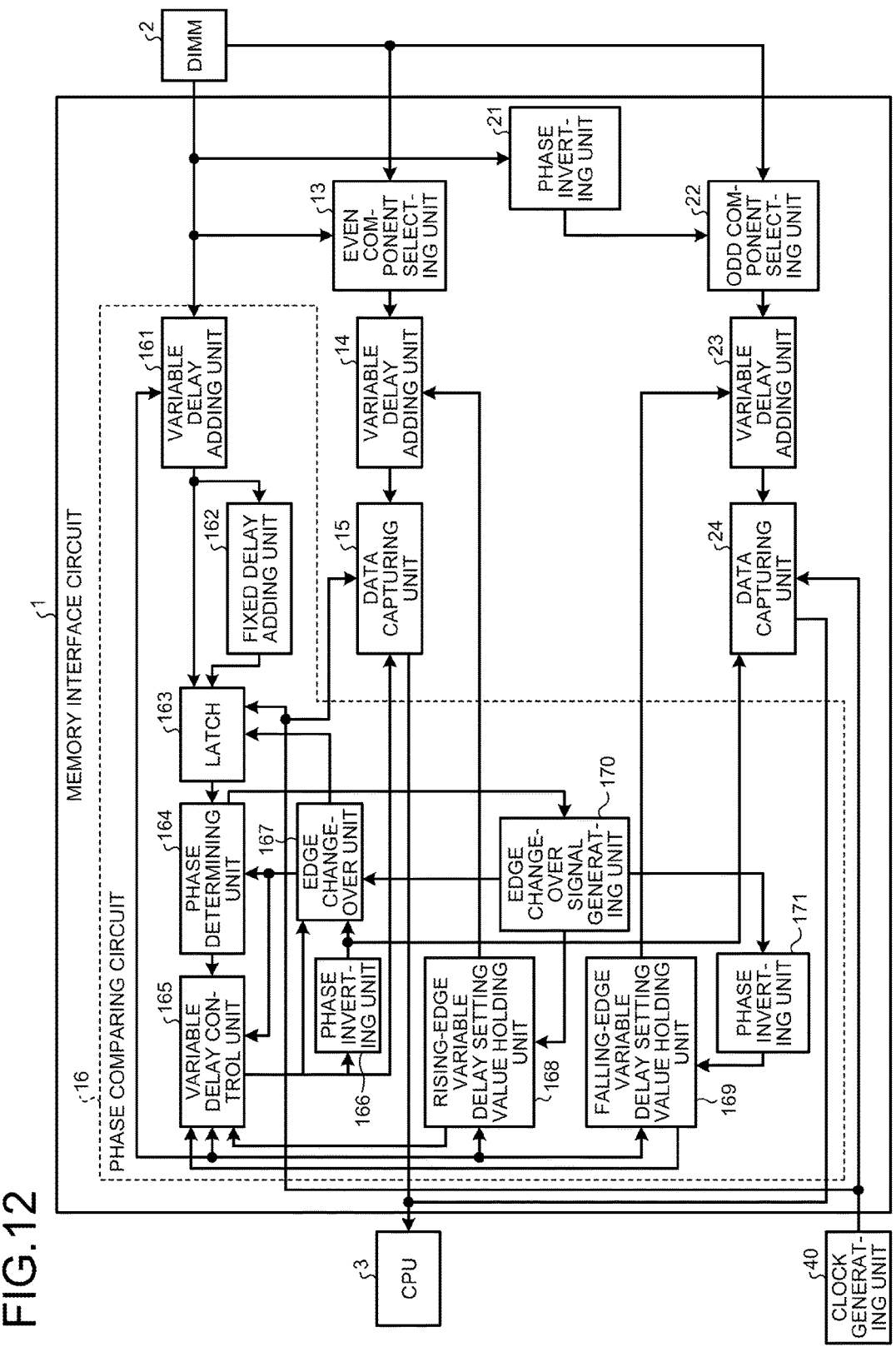
FIG. 12 is a block diagram illustrating a memory interface circuit and an information processing apparatus according to a second embodiment.

FIG. 12 is a block diagram illustrating a memory interface circuit and an information processing apparatus according to a second embodiment. The information processing apparatus according to the second embodiment differs from the information processing apparatus according to the first embodiment in that the rising-edge variable delay amount and the falling-edge variable delay amount are obtained using the same phase comparing circuit. In the following description, components having the same functions as in the first embodiment will be omitted.

A phase comparing circuit 16 performs the functions performed by both the rising edge-side phase comparing circuit 11 and the falling edge-side phase comparing circuit 12 illustrated in FIG. 2. Briefly, the phase comparing circuit 16 first performs the same operation as that performed by the rising edge-side phase comparing circuit 11 to obtain the rising-edge variable delay amount and then performs the same operation as that performed by the falling edge-side phase comparing circuit 12 to thereby obtain the falling-edge variable delay amount. This will be described in detail below.

The phase comparing circuit 16 includes a variable delay adding unit 161, a fixed delay adding unit 162, a latch 163, a phase determining unit 164, and a variable delay control unit 165. The phase comparing circuit 16 further includes a phase inverting unit 166, an edge changeover unit 167, a rising-edge variable delay setting value holding unit 168, a falling-edge variable delay setting value holding unit 169, a phase inverting unit 171, and an edge changeover signal generating unit 170. The phase comparing circuit 16 is an example "changeover phase difference detecting unit".

The variable delay adding unit 161 performs the same operations as those performed by the variable delay adding unit 111 and the variable delay adding unit 121 illustrated in FIG. 2.

The fixed delay adding unit 162 performs the same operations as those performed by the fixed delay adding unit 112 and the fixed delay adding unit 122 illustrated in FIG. 2.

The latch 163, when making a rising-edge phase determination, receives an input of the rising-edge IH signal from the edge changeover unit 167. The latch 163 then performs the same operation as that performed by the latch 113 illustrated in FIG. 2. When making a falling-edge phase determination, the latch 163 receives an input of the falling-edge IH signal from the edge changeover unit 167. The latch 163 then performs the same operation as that performed by the latch 123 illustrated in FIG. 2.

The phase determining unit 164, when making a rising-edge phase determination, receives from the edge changeover unit 167 an edge changeover signal for making a phase determination using the rising edge. In this case, the phase determining unit 164 performs the same operation as that performed by the phase determining unit 114 illustrated in FIG. 2. When making a falling-edge phase determination, the phase determining unit 164 receives from the edge changeover unit 167 an edge changeover signal for making a phase determination using the falling edge. In this case, the phase determining unit 164 performs the same operation as that performed by the phase determining unit 124 illustrated in FIG. 2.

The phase determining unit 164 then outputs the obtained phase information to the edge changeover signal generating unit 170.

Figure 13:
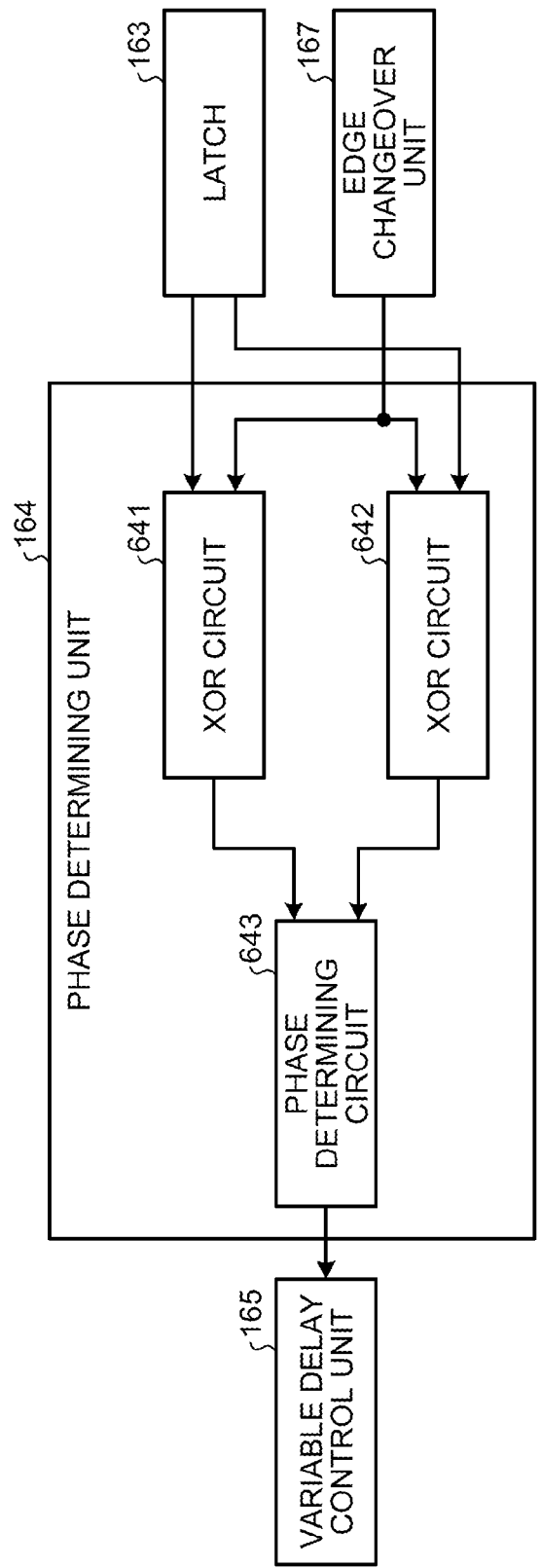
FIG. 13 is a block diagram illustrating details of a phase determining unit according to the second embodiment.

The phase determining unit 164 according to the second embodiment will be described in detail below with reference to FIG. 13. FIG. 13 is a block diagram illustrating details of the phase determining unit according to the second embodiment. The phase determining unit 164 includes XOR circuits 641, 642 and a phase determining circuit 643.

The edge changeover unit 167 inputs "0" as an edge changeover signal for making a phase determination using the rising edge to each of the XOR circuits 641 and 642. Alternatively, the edge changeover unit 167 inputs "1" as an edge changeover signal for making a phase determination using the falling edge to each of the XOR circuits 641 and 642.

For a rising-edge phase determination, the XOR circuit 641 receives an input of phase information of the rising-edge preceding signal from the latch 163. Alternatively, for a falling-edge phase determination, the XOR circuit 641 receives an input of phase information of the falling-edge preceding signal from the latch 163.

For the rising-edge phase determination, the XOR circuit 641 finds and outputs exclusive OR of the "0" input from the edge changeover unit 167 and the phase information of the rising-edge preceding signal. Specifically, for the rising-edge phase determination, the XOR circuit 641 outputs the phase information of the rising-edge preceding signal input from the latch 163 as is.

In contrast, for the falling-edge phase determination, the XOR circuit 641 finds and outputs exclusive OR of the "1" input from the edge changeover unit 167 and the falling-edge preceding signal. Specifically, for the falling-edge phase determination, the XOR circuit 641 outputs reversal of the phase information of the rising-edge preceding signal input from the latch 163.

For a rising-edge phase determination, the XOR circuit 642 receives an input of phase information of the rising-edge following signal from the latch 163. Alternatively, for a falling-edge phase determination, the XOR circuit 642 receives an input of phase information of the falling-edge following signal from the latch 163.

For the rising-edge phase determination, the XOR circuit 642 finds and outputs exclusive OR of the "0" input from the edge changeover unit 167 and the phase information of the rising-edge following signal. Specifically, for the rising-edge phase determination, the XOR circuit 642 outputs the phase information of the rising-edge following signal input from the latch 163 as is.

In contrast, for the falling-edge phase determination, the XOR circuit 642 finds and outputs exclusive OR of the "1" input from the edge changeover unit 167 and the falling-edge following signal. Specifically, for the falling-edge phase determination, the XOR circuit 642 outputs reversal of the phase information of the falling-edge following signal input from the latch 163.

The phase determining circuit 643 performs the same operation as that performed by the phase determining unit 114 illustrated in FIG. 2. Specifically, the phase determining circuit 643 receives inputs of phase information of rising-edge or falling-edge preceding signal and following signal from the XOR circuits 641 and 642. The phase determining circuit 643 then determines the phase condition of the DQS signal using the correspondence specified in the phase determining table 210 illustrated in FIG. 4.

The falling-edge phase determination will be described below. FIG. 14 is a diagram for illustrating the falling-edge phase determination made by the phase determining unit according to the second embodiment.

The "phase information" column of FIG. 14 represents phase information input from the variable delay adding unit 161 and the fixed delay adding unit 162. Of the 2 bits that represent the phase information, the high-order bit represents the value of the falling-edge following signal and the low-order bit represents the value of the falling-edge preceding signal. Additionally, for the "post-XOR phase information", the high-order bit is output from the XOR circuit 642 and the low-order bit is output from the XOR circuit 641.

Because HIGH and LOW are inverted on the rising edge and the falling edge as compared with the rising edge, a signal having the falling-edge phase information inverted can be determined using the same logic as that used in the rising-edge phase determination. As illustrated in FIG. 14, the post-XOR phase information is reversal of the phase information. Specifically, when using the post-XOR phase information, the phase determining unit 164 can determine the phase condition using the same logic as that used in the rising-edge phase determination as illustrated in FIG. 14. As described above, disposing the XOR circuit 641 and the XOR circuit 642 enables the same logic to be used both in the rising-edge phase determination and the falling-edge phase determination, thus allowing the phase determining circuit 643 to be shared.

Reference is made back to FIG. 12 to continue describing the memory interface circuit and the information processing apparatus according to the second embodiment. For the rising-edge phase determination, the variable delay control unit 165 receives from the edge changeover unit 167 an edge changeover signal for performing the phase determination using the rising edge. In this case, the variable delay control unit 165 reads the variable delay setting value stored in the rising-edge variable delay setting value holding unit 168 and, as with the variable delay control unit 115 illustrated in FIG. 2, finds the variable delay setting value in the rising-edge phase determination process. Then, the variable delay control unit 165 sequentially overwrites and stores the rising-edge variable delay setting value in the rising-edge variable delay setting value holding unit 168. When the phases coincide with each other thereafter, the variable delay control unit 165 outputs a notification of completion of calculation of the rising-edge variable delay setting value to the rising-edge variable delay setting value holding unit 168.

For the falling-edge phase determination, the variable delay control unit 165 receives from the edge changeover unit 167 an edge changeover signal for performing the phase determination using the falling edge. In this case, the variable delay control unit 165 reads the variable delay setting value stored in the falling-edge variable delay setting value holding unit 169 and, as with the variable delay control unit 125 illustrated in FIG. 2, finds the falling-edge variable delay setting value. Then, the variable delay control unit 165 sequentially overwrites and stores the falling-edge variable delay setting value in the falling-edge variable delay setting value holding unit 169. When the falling-edge phases coincide with each other thereafter, the variable delay control unit 165 outputs a notification of completion of calculation of the falling-edge variable delay setting value to the falling-edge variable delay setting value holding unit 169.

The edge changeover unit 167 receives an input of the IH signal from the variable delay control unit 165. This IH signal is the same as the rising-edge IH signal in the first embodiment. In addition, the edge changeover unit 167 receives from the phase inverting unit 166 an input of an inverted signal of the IH signal output from the variable delay control unit 165.

For the rising-edge phase determination, the edge changeover unit 167 receives from the edge changeover signal generating unit 170 an edge changeover signal for performing the phase determination using the rising edge. In this case, the edge changeover unit 167 outputs the IH signal received from the variable delay control unit 165 to the latch 163, the phase determining unit 164, and the variable delay control unit 165.

For the falling-edge phase determination, the edge changeover unit 167 receives from the edge changeover signal generating unit 170 an edge changeover signal for performing the phase determination using the falling edge. In this case, the edge changeover unit 167 outputs the signal received from the phase inverting unit 166, specifically, the inverted signal of the IH signal output from the variable delay control unit 165 to the latch 163, the phase determining unit 164, and the variable delay control unit 165.

For the rising-edge phase determination, the rising-edge variable delay setting value holding unit 168 receives from the edge changeover signal generating unit 170 an edge changeover signal for performing the phase determination using the rising edge. The rising-edge variable delay setting value holding unit 168 then receives from the variable delay control unit 165 the variable delay setting value in the rising-edge phase determination and sequentially overwrites and stores the variable delay setting value.

The rising-edge variable delay setting value holding unit 168 then receives from the variable delay control unit 165 the notification of completion of calculation of the rising-edge variable delay setting value. In this case, the rising-edge variable delay setting value holding unit 168 outputs to the variable delay adding unit 14 the variable delay setting value to be stored.

For the falling-edge phase determination, the falling-edge variable delay setting value holding unit 169 receives from the phase inverting unit 171 an edge changeover signal for performing the phase determination using the falling edge. The falling-edge variable delay setting value holding unit 169 then receives from the variable delay control unit 165 the variable delay setting value in the falling-edge phase determination and sequentially overwrites and stores the variable delay setting value.

The falling-edge variable delay setting value holding unit 169 then receives from the variable delay control unit 165 the notification of completion of calculation of the falling-edge variable delay setting value. In this case, the falling-edge variable delay setting value holding unit 169 outputs to the variable delay adding unit 23 the variable delay setting value to be stored.

The edge changeover signal generating unit 170 receives an input of phase information from the phase determining unit 164. When the input of the phase information reaches a predetermined condition, the edge changeover signal generating unit 170 outputs a signal for changing over the phase determining edge to the rising-edge variable delay setting value holding unit 168, the edge changeover unit 167, and the phase inverting unit 171. The following describes example generation of the edge changeover signal by the edge changeover signal generating unit 170.

For example, when the phase coincident condition is detected as a result of phase comparison, the edge changeover signal generating unit 170 inverts the edge changeover signal. Alternatively, the edge changeover signal generating unit 170 may invert the edge changeover signal when the phase coincident condition is detected a predetermined number of times as a result of phase comparison. In this case, the predetermined number of times may be one or more. Still alternatively, the edge changeover signal generating unit 170 may invert the edge changeover signal when a predetermined number of bits of data are read upon receipt of notification to read data from the data capturing unit 15 or 24. Still alternatively, the edge changeover signal generating unit 170 may receive information of continuous data from, for example, the CPU 3 and, at the end of the reading of the continuous data, may invert the edge changeover signal.

The following describes, with reference to FIG. 15, a data capturing process performed by the memory controller 10 according to the second embodiment. FIG. 15 is a flowchart illustrating the data capturing process performed by the memory controller according to the second embodiment.

The edge changeover signal generating unit 170 determines whether the edge changeover signal is rising (step S101). If the edge changeover signal is rising (Yes at step S101), the edge changeover signal generating unit 170 outputs the edge changeover signal for performing the phase determination using the rising edge to the rising-edge variable delay setting value holding unit 168, the edge changeover unit 167, and the phase inverting unit 171. The edge changeover unit 167 outputs to the latch 163 the IH signal output from the variable delay control unit 165. The edge changeover unit 167 further outputs the edge changeover signal to the phase determining unit 164 and the variable delay control unit 165.

The latch 163 receives inputs of the rising-edge preceding signal and the rising-edge following signal from the variable delay adding unit 161 and the fixed delay adding unit 162. The latch 163 then acquires the phase condition of each of the rising-edge preceding signal and the rising-edge following signal. Thereafter, the latch 163 outputs the phase condition of each of the rising-edge preceding signal and the rising-edge following signal to the phase determining unit 164. The phase determining unit 164 determines, from the phase condition of each of the rising-edge preceding signal and the rising-edge following signal received from the latch 163, whether the phases of the rising edges of the DQS signals coincide with each other (step S102).

If the phases do not coincide with each other (No at step S102), the variable delay control unit 165 adjusts the rising-edge variable delay setting value (step S103). Thereafter, the phase comparing circuit 16 performs step S102.

If the phases coincide with each other (Yes at step S102), the rising-edge variable delay setting value holding unit 168 retains the rising-edge variable delay setting value that brings the rising edge of the DQS signal into phase with the internal clock signal (step S104).

The variable delay adding unit 14 reads from the rising-edge variable delay setting value holding unit 168 the rising-edge variable delay setting value that brings the rising edge of the DQS signal into phase with the internal clock signal (step S105).

Then, the variable delay adding unit 14 adds, to the EVEN component of the DQ signal, the rising-edge variable delay amount that brings the rising edge of the DQS signal into phase with the internal clock signal (step S106).

The data capturing unit 15 captures data from the EVEN component of the DQ signal to which the rising-edge variable delay amount is added at a timing of the falling edge of the internal clock signal when the IH signal generated by the variable delay control unit 165 remains LOW (step S107).

Meanwhile, the variable delay adding unit 23 reads from the falling-edge variable delay setting value holding unit 169 the falling-edge variable delay setting value that brings the falling edge of the DQS signal into phase with the internal clock signal (step S108).

Then, the variable delay adding unit 23 adds, to the ODD component of the DQ signal, the falling-edge variable delay amount that brings the falling edge of the DQS signal into phase with the internal clock signal (step S109).

The data capturing unit 24 captures data from the ODD component of the DQ signal to which the falling-edge variable delay amount is added at a timing of the falling edge of the internal clock signal when the signal having a phase inverted from the phase of the IH signal generated by the variable delay control unit 165 remains LOW (step S110). Thereafter the phase comparing circuit 16 performs step S120.

If the process starts with the edge changeover signal being falling (No at step S101), the edge changeover signal generating unit 170 outputs the edge changeover signal for performing the phase determination using the falling edge to the falling-edge variable delay setting value holding unit 169, the edge changeover unit 167, and the phase inverting unit 171. The edge changeover unit 167 outputs an inverted signal of the IH signal output from the variable delay control unit 165 to the latch 163, the phase determining unit 164, and the variable delay control unit 165.

The latch 163 receives inputs of the falling-edge preceding signal and the falling-edge following signal from the variable delay adding unit 161 and the fixed delay adding unit 162. The latch 163 then acquires the phase condition of each of the falling-edge preceding signal and the falling-edge following signal. Thereafter, the latch 163 outputs the phase condition of each of the falling-edge preceding signal and the falling-edge following signal to the phase determining unit 164. The phase determining unit 164 determines, from the phase condition of each of the falling-edge preceding signal and the falling-edge following signal received from the latch 163, whether the phases of the falling edges of the DQS signals coincide with each other (step S111).

If the phases do not coincide with each other (No at step S111), the variable delay control unit 165 adjusts the falling-edge variable delay setting value (step S112). Thereafter, the phase comparing circuit 16 performs step S111.

If the phases coincide with each other (Yes at step S111), the falling-edge variable delay setting value holding unit 169 retains the falling-edge variable delay setting value that brings the falling edge of the DQS signal into phase with the internal clock signal (step S113).

The variable delay adding unit 23 reads from the falling-edge variable delay setting value holding unit 169 the falling-edge variable delay setting value that brings the falling edge of the DQS signal into phase with the internal clock signal (step S114).

Then, the variable delay adding unit 23 adds, to the ODD component of the DQ signal, the falling-edge variable delay amount that brings the falling edge of the DQS signal into phase with the internal clock signal (step S115).

The data capturing unit 24 captures data from the ODD component of the DQ signal to which the falling-edge variable delay amount is added at a timing of the falling edge of the internal clock signal when the inverted signal of the IH signal generated by the variable delay control unit 165 remains LOW (step S116).

The variable delay adding unit 14 reads from the rising-edge variable delay setting value holding unit 168 the rising-edge variable delay setting value that brings the rising edge of the DQS signal into phase with the internal clock signal (step S117).

Then, the variable delay adding unit 14 adds, to the EVEN component of the DQ signal, the rising-edge variable delay amount that brings the rising edge of the DQS signal into phase with the internal clock signal (step S118).

The data capturing unit 15 captures data from the EVEN component of the DQ signal to which the rising-edge variable delay amount is added at a timing of the falling edge of the internal clock signal when the IH signal generated by the variable delay control unit 165 remains LOW (step S119).

The CPU 3 receives the data captured from the EVEN component of the DQ signal and the data captured from the ODD component of the DQ signal (step S120). This allows the CPU 3 to read data from the DIMM 2.

The memory interface circuit 1 then determines whether the operation of the information processing apparatus on which the memory interface circuit 1 is mounted is stopped (step S121). If the operation is not stopped (No at step S121), the memory interface circuit 1 performs step S101.

If the operation is stopped (Yes at step S121), the memory interface circuit 1 stops operating.

As described heretofore, the memory interface circuit according to the second embodiment uses one phase comparing circuit to obtain the variable delay setting value in the phase adjustment using the rising edge of the DQS signal and the variable delay setting value in the phase adjustment using the falling edge of the DQS signal. Specifically, the memory interface circuit according to the second embodiment can reduce mounting scale by about one phase comparing circuit as compared with the memory interface circuit according to the first embodiment.

The embodiments have been described for a configuration in which, as illustrated in FIG. 1, the memory controller 10 is disposed on the chip set 100 different from the CPU 3. This is, however, not the only possible hardware configuration.

The memory controller 10 on which the memory interface circuit 1 according to each of the first and second embodiments is mounted may be mounted on the CPU 3. In this case, the arithmetic operation unit 31 and the memory controller 10 are mounted on the CPU 3.

One aspect of the signal control circuits, the information processing apparatuses, and the signal control methods disclosed in the present application provides an advantageous effect of reducing occurrence of data failures.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A signal control circuit, comprising:
    an acquiring unit that acquires a first signal from a data signal based on a rising edge of a reference signal and that acquires a second signal from the data signal based on a falling edge of the reference signal;
    a delay adding unit that generates a rising-edge preceding signal by giving the reference signal a first variable delay, generates a rising-edge following signal by giving the rising-edge preceding signal a first fixed delay, determines the first variable delay such that a rising edge of the rising-edge preceding signal and a rising-edge of the rising-edge following signal are before and after a falling edge of the benchmark signal as a first delay, and gives the first signal the first delay and that generates a falling-edge preceding signal by giving a reference signal a second variable delay, generates a falling-edge following signal by giving the falling-edge preceding signal a second fixed delay, determines the second variable delay such that a falling edge of the falling-edge preceding signal and a falling-edge of the falling-edge following signal are before and after a falling edge of the benchmark signal as a second delay, and gives the second signal the second delay; and
    a data capturing unit that captures, based on the benchmark signal, data from the first signal to which the first delay is given and the second signal to which the second delay is given.

2. The signal control circuit according to claim 1, wherein the delay adding unit includes:
    a first phase difference detecting unit that detects the phase difference between the benchmark signal and the rising edge of the reference signal;

a first delay adding unit that gives the first signal the first delay based on the phase difference detected by the first phase difference detecting unit;

a second phase difference detecting unit that detects the phase difference between the benchmark signal and the falling edge of the reference signal concurrently with the detection of the phase difference by the first phase difference detecting unit; and a second delay adding unit that gives the second signal the second delay based on the phase difference detected by the second phase difference detecting unit.

3. The signal control circuit according to claim 1, wherein the delay adding unit includes:

a changeover phase difference detecting unit that detects the phase difference between the benchmark signal and the rising edge of the reference signal and the phase difference between the benchmark signal and the falling edge of the reference signal at respective timings;

a first delay adding unit that gives the first signal the first delay based on the phase difference detected by the changeover phase difference detecting unit; and a second delay adding unit that gives the second signal the second delay based on the phase difference detected by the changeover phase difference detecting unit.

4. An information processing apparatus comprising:

an arithmetic operation unit; and a memory controller, the memory controller comprising:

an acquiring unit that acquires a first signal from a data signal based on a rising edge of a reference signal and that acquires a second signal from the data signal based on a falling edge of the reference signal;

a delay adding unit that generates a rising-edge preceding signal by giving the reference signal a first variable delay, generates a rising-edge following signal by giving the rising-edge preceding signal a first fixed delay, determines the first variable delay such that a rising edge of the rising-edge preceding signal and a rising-edge of the rising-edge following signal are before and after a falling edge of the benchmark signal as a first delay, and gives the first signal the first delay and that generates a falling-edge preceding signal by giving a reference signal a second variable delay, generates a falling-edge following signal by giving the falling-edge preceding signal a second fixed delay, determines the second variable delay such that a falling edge of the falling-edge preceding signal and a falling-edge of the falling-edge following signal are before and after a falling edge of the benchmark signal as a second delay, and gives the second signal the second delay; and a data capturing unit that captures, based on the benchmark signal, data from the first signal to which the first delay is given and the second signal to which the second delay is given; and the arithmetic operation unit performing arithmetic operations using the data captured by the data capturing unit.

5. A signal control method, comprising:

acquiring a first signal from a data signal based on a rising edge of a reference signal;

acquiring a second signal from the data signal based on a falling edge of the reference signal;

generates a rising-edge preceding signal by giving the reference signal a first variable delay;

generates a rising-edge following signal by giving the rising-edge preceding signal a first fixed delay;

determines the first variable delay such that a rising edge of the rising-edge preceding signal and a rising-edge of the rising-edge following signal are before and after a falling edge of the benchmark signal as a first delay;

giving the first signal the first delay;

generates a falling-edge preceding signal by giving a reference signal a second variable delay;

generates a falling-edge following signal by giving the falling-edge preceding signal a second fixed delay;

determines the second variable delay such that a falling edge of the falling-edge preceding signal and a falling-edge of the falling-edge following signal are before and after a falling edge of the benchmark signal as a second delay;

giving the second signal the second delay; and based on the benchmark signal, capturing data from the first signal to which the first delay is given and the second signal to which the second delay is given.

* * * * *